United States Patent
Mola et al.

(10) Patent No.: US 10,235,273 B2
(45) Date of Patent: *Mar. 19, 2019

(54) INDEXING A TRACE BY INSERTION OF KEY FRAMES FOR REPLAY RESPONSIVENESS

(71) Applicant: MICROSOFT TECHNOLOGY LICENSING, LLC, Redmond, WA (US)

(72) Inventors: Jordi Mola, Bellevue, WA (US); Juan Carlos Arevalo Baeza, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,323

(22) Filed: Mar. 9, 2018

(65) Prior Publication Data

US 2018/0260299 A1 Sep. 13, 2018

Related U.S. Application Data

(63) Continuation of application No. 15/453,008, filed on Mar. 8, 2017, now Pat. No. 9,934,127.

(51) Int. Cl.
*G06F 11/36* (2006.01)
*G06F 9/44* (2018.01)
(Continued)

(52) U.S. Cl.
CPC ........ *G06F 11/364* (2013.01); *G06F 11/3476* (2013.01); *G06F 11/3636* (2013.01); *G06F 17/30312* (2013.01); *G06F 11/3632* (2013.01)

(58) Field of Classification Search
CPC ............ G06F 11/3636; G06F 11/3476; G06F 11/366; G06F 11/364; G06F 11/3632;
(Continued)

(56) References Cited

U.S. PATENT DOCUMENTS 5,870,607 A 2/1999 Netzer
6,018,786 A 1/2000 Krick et al.
(Continued)

FOREIGN PATENT DOCUMENTS

JP 2005222422 A 8/2005

OTHER PUBLICATIONS

Khoo et al., Expositor: scriptable time-travel debugging with first-class traces, 10 pages (Year: 2013).*

(Continued)

*Primary Examiner* — Thuy Dao
(74) *Attorney, Agent, or Firm* — Workman Nydegger

(57) ABSTRACT

Creating key frames during indexing of a trace for responsive trace replay. A method includes identifying responsiveness goal(s) for trace replay, including identifying a target trace section replay time. A portion of execution of executable entit(ies) is replayed based on trace data stream(s). While replaying execution of the executable entit(ies), and based on the identified target trace section replay time, points of interest in execution of the executable entit(ies) are identified. At least one key frame is created for each of the identified plurality of points of interest. Each key frame enables replay of at least one of the one or more executable entities beginning at the key frame.

20 Claims, 8 Drawing Sheets

(51) Int. Cl.
*G06F 17/30* (2006.01)
*G06F 11/34* (2006.01)

(58) Field of Classification Search
CPC ........... G06F 11/3664; G06F 17/30312; G06F 17/5022; G06F 21/10; H04N 7/17318
See application file for complete search history.

(56) References Cited

U.S. PATENT DOCUMENTS

| | | | |
|---|---|---|---|
| 6,145,121 A | 11/2000 | Levy et al. | |
| 6,795,836 B2 | 9/2004 | Arnold et al. | |
| 6,892,325 B2 | 5/2005 | Bates et al. | |
| 6,901,581 B1 | 5/2005 | Schneider | |
| 7,209,058 B2 | 4/2007 | Swoboda | |
| 7,284,052 B1 | 10/2007 | Anderson | |
| 7,392,514 B2 | 6/2008 | Edwards | |
| 7,454,407 B2 | 11/2008 | Chaudhuri et al. | |
| 7,620,938 B2 | 11/2009 | Edwards et al. | |
| 7,681,182 B1 | 3/2010 | Mistry et al. | |
| 7,739,664 B2 | 6/2010 | Bates et al. | |
| 7,757,065 B1 | 7/2010 | Jourdan et al. | |
| 7,814,486 B2* | 10/2010 | Papakipos | G06F 9/5027 717/140 |
| 7,996,686 B2* | 8/2011 | LeGendre | G06F 21/121 713/189 |
| 8,015,552 B1 | 9/2011 | Lindahl et al. | |
| 8,037,285 B1 | 10/2011 | Thaik et al. | |
| 8,108,844 B2 | 1/2012 | Crutchfield et al. | |
| 8,132,159 B1 | 3/2012 | Lindahl et al. | |
| 8,166,348 B1 | 4/2012 | Kulkarni et al. | |
| 8,276,127 B2 | 9/2012 | Rydh et al. | |
| 8,364,691 B2 | 1/2013 | Kennedy et al. | |
| 8,375,368 B2 | 2/2013 | Tuck et al. | |
| 8,423,965 B2 | 4/2013 | Goel et al. | |
| 8,429,617 B2* | 4/2013 | Demetriou | G06F 11/3664 714/35 |
| 8,443,349 B2 | 5/2013 | Papakipos et al. | |
| 8,448,156 B2 | 5/2013 | Demetriou et al. | |
| 8,521,765 B2 | 8/2013 | George et al. | |
| 8,522,047 B2 | 8/2013 | Eker et al. | |
| 8,522,176 B2* | 8/2013 | Ho | G06F 11/362 716/106 |
| 8,555,385 B1 | 10/2013 | Bhatkar et al. | |
| 8,612,939 B2 | 12/2013 | Marenco | |
| 8,719,796 B2 | 5/2014 | Rosu et al. | |
| 8,719,800 B2 | 5/2014 | Chow et al. | |
| 8,745,591 B2 | 6/2014 | De Smet et al. | |
| 8,751,466 B1 | 6/2014 | Tsay | |
| 8,910,120 B2 | 12/2014 | Srinivasa et al. | |
| 8,924,912 B2 | 12/2014 | Ho et al. | |
| 8,935,673 B1 | 1/2015 | Ashkenazi et al. | |
| 8,938,720 B2* | 1/2015 | Meijler | G06F 11/3476 717/128 |
| 8,997,057 B1 | 3/2015 | Diwan et al. | |
| 9,020,939 B2 | 4/2015 | Brodsky et al. | |
| 9,122,795 B1 | 9/2015 | Daudel et al. | |
| 9,129,058 B2 | 9/2015 | Cui et al. | |
| 9,189,254 B2 | 11/2015 | Kushman et al. | |
| 9,195,562 B2 | 11/2015 | Luo et al. | |
| 9,223,677 B2* | 12/2015 | Swaine | G06F 11/3636 |
| 9,251,364 B2 | 2/2016 | Ture et al. | |
| 9,262,538 B2 | 2/2016 | Melman | |
| 9,329,975 B2 | 5/2016 | Park et al. | |
| 9,424,162 B2 | 8/2016 | Sivathanu et al. | |
| 9,436,588 B2 | 9/2016 | Koren et al. | |
| 9,467,437 B2 | 10/2016 | Krishnaprasad et al. | |
| 9,477,576 B2 | 10/2016 | Granshaw et al. | |
| 9,501,383 B2 | 11/2016 | Bolignano | |
| 9,588,870 B2 | 3/2017 | Marron et al. | |
| 9,612,938 B2 | 4/2017 | Binns et al. | |
| 9,632,914 B2 | 4/2017 | Cheng et al. | |
| 9,652,101 B2 | 5/2017 | McMillen | |
| 9,916,232 B2 | 3/2018 | Voccio et al. | |
| 9,934,126 B1 | 4/2018 | Mola et al. | |
| 9,940,369 B1 | 4/2018 | Mola | |
| 9,959,194 B1 | 5/2018 | Mola | |
| 9,983,978 B1 | 5/2018 | Mola et al. | |
| 10,013,331 B2 | 7/2018 | Brodsky et al. | |
| 10,031,833 B2* | 7/2018 | Mola | G06F 11/3636 |
| 2002/0129343 A1 | 9/2002 | Pinter et al. | |
| 2003/0191783 A1 | 10/2003 | Wolczko et al. | |
| 2004/0221115 A1* | 11/2004 | Sahin | G06F 11/3466 711/154 |
| 2004/0243894 A1 | 12/2004 | Smith et al. | |
| 2005/0097100 A1 | 5/2005 | Galindo-Legaria et al. | |
| 2006/0036579 A1 | 2/2006 | Byrd et al. | |
| 2006/0074622 A1 | 4/2006 | Scott et al. | |
| 2006/0129871 A1 | 6/2006 | Smith | |
| 2006/0129893 A1 | 6/2006 | Smith | |
| 2006/0212688 A1 | 9/2006 | Chaudhry et al. | |
| 2007/0168989 A1 | 7/2007 | Edwards et al. | |
| 2008/0155342 A1 | 6/2008 | O'Callahan | |
| 2008/0270482 A1 | 10/2008 | Hillberg et al. | |
| 2008/0288741 A1 | 11/2008 | Lee et al. | |
| 2009/0199163 A1 | 8/2009 | Soroker et al. | |
| 2009/0265402 A1 | 10/2009 | Dussud et al. | |
| 2009/0328002 A1 | 12/2009 | Lin et al. | |
| 2010/0049938 A1 | 2/2010 | Izumi et al. | |
| 2010/0180263 A1 | 7/2010 | Lee et al. | |
| 2010/0299654 A1 | 11/2010 | Vaswani et al. | |
| 2010/0306588 A1 | 12/2010 | Hamilton et al. | |
| 2011/0087926 A1 | 4/2011 | Arnold et al. | |
| 2011/0167412 A1 | 7/2011 | Kahlon et al. | |
| 2011/0314264 A1 | 12/2011 | Horley et al. | |
| 2012/0110589 A1 | 5/2012 | Ghosh et al. | |
| 2012/0185675 A1 | 7/2012 | Kim et al. | |
| 2012/0324236 A1 | 12/2012 | Srivastava et al. | |
| 2013/0036403 A1 | 2/2013 | Geist | |
| 2013/0066927 A1 | 3/2013 | Hillberg et al. | |
| 2013/0104107 A1 | 4/2013 | De Smet et al. | |
| 2013/0117848 A1 | 5/2013 | Golshan et al. | |
| 2013/0218315 A1 | 8/2013 | Jaeger | |
| 2014/0108463 A1 | 4/2014 | Gagliardi et al. | |
| 2014/0165023 A1 | 6/2014 | Ho et al. | |
| 2014/0282418 A1 | 9/2014 | Wood et al. | |
| 2015/0026666 A1 | 1/2015 | Tojo et al. | |
| 2015/0066881 A1 | 3/2015 | Sundaram et al. | |
| 2015/0143344 A1 | 5/2015 | Davis | |
| 2015/0378870 A1 | 12/2015 | Marron et al. | |
| 2016/0041894 A1 | 2/2016 | Reid et al. | |
| 2016/0292061 A1 | 10/2016 | Marron et al. | |
| 2016/0364325 A1 | 12/2016 | Ouzzani et al. | |
| 2018/0260302 A1 | 9/2018 | Mola et al. | |

OTHER PUBLICATIONS

Wu et al., Elastic and scalable tracing and accurate replay of non-deterministic events, 10 pages (Year: 2013).*
"Chronon Time Travelling Debugger", Retrieved from <<http://chrononsystems.com/products/chronon-time-travelling-debugger,>> Nov. 28, 2016, 4 Pages.
"Non-Final Office Action Issued in U.S. Appl. No. 15/453,008", dated Oct. 19, 2017, 12 Pages.
"Notice of Allowance Issued in U.S. Appl. No. 15/453,008", dated Dec. 20, 2017, 9 Pages.
"Non-Final Office Action Issued in U.S. Appl. No. 15/453,060", dated Oct. 17, 2017, 22 Pages.
"Non-Final Office Action Issued in U.S. Appl. No. 15/591,521", dated Oct. 20, 2017, 23 Pages.
"Notice of Allowance Issued in U.S. Appl. No. 15/591,706", dated Nov. 27, 2017, 19 Pages.
Argelius, Andreas, "Time Travel in React Redux apps using the Redux DevTools", Retrieved from <<https://onsen.io/blog/react-redux-devtools-with-time-travel/,>> Jun. 13, 2016, 13 Pages.
Barr, et al., "Time-Travel Debugging for JavaScript/Node.js", In Proceedings of the ACM International Symposium on the Foundations of Software Engineering, Sep. 12, 2016, 5 Pages.
Bhansali, et al., "Framework for Instruction-level Tracing and Analysis of Program Executions", In Proceedings of the 2nd International Conference on Virtual Execution Environments, Jun. 14, 2006, pp. 154-163.

(56) References Cited

OTHER PUBLICATIONS

Booth, et al., "Walk Backwards to Happiness-Debugging by Time Travel", In Proceedings of the 3rd International Workshop on Automatic Debugging, Jul. 1997, 14 Pages.
Bowman, et al., "Optimization of Query Streams Using Semantic Prefetching", In Journal of ACM Transactions on Database Systems, vol. 30 Issue 4, Jun. 13, 2004, 12 Pages.
Guo, et al., "Accurately Choosing Execution Runs for Software Fault Localization", In Journal of International Conference on Compiler Construction, Mar. 30, 2006, 15 Pages.
James E. Hicks E., "Compiler-Directed Storage Reclamation Using Object Lifetime Analysis", In Technical Report of MIT/LCS/TR3-555, Oct. 1992, 183 Pages.
Jensen, et al., "MemInsight: Platform-Independent Memory Debugging for JavaScript", In Proceedings of the 2015 10th Joint Meeting on Foundations of Software Engineering, Aug. 30, 2015, 12 Pages.
K, Anand, "Microsoft Time Travel Tracing Diagnostic Tool", Retrieved from <<http://www.thewindowsclub.com/microsoft-time-travel-tracing-diagnostic,>> Jul. 21, 2013, 3 Pages.
King, et al., "Debugging Operating Systems With Time-Traveling Virtual Machines", In Proceedings of USENIX Annual Technical Conference, Apr. 10, 2005, pp. 1-15.
Le, et al., "Lecture 11. Applications of Program Analysis", Retrieved from <<http://web.cs.iastate.edu/~weile/cs641/11.ApplicationsOfProgramAnalysis.pdf>>, Dec. 2014, 13 Pages.
Lewis, Bill, "Debugging Backwards in Time", In Proceedings of the Fifth International Workshop on Automated and Algorithmic Debugging, Sep. 2003, pp. 225-235.
Miranskyy, et al., "An Iterative, Multi-Level, and Scalable Approach to Comparing Execution Traces", In Proceedings of the the 6th joint meeting of the European Software Engineering Conference and the ACM SIGSOFT Symposium on The Foundations of Software Engineering, Sep. 3, 2007, pp. 537-540.
Pandy, Laslo, "Elm's Time Traveling Debugger", Retrieved from <<http://web.archive.org/web/20140416213617/http:/debug.elm-lang.org/>>, Apr. 16, 2014, 6 pages.
Phang, et al., "EXPOSITOR: Scriptable Time-Travel Debugging with First-Class Traces", In Proceedings of the 35th International Conference on Software Engineering, May 18, 2013, pp. 352-361.
Pothier, et al., "Summarized Trace Indexing and Querying for Scalable Back-in-Time Debugging", In Proceedings of 25th European Conference on Object-Oriented Programming, Jul. 25, 2011, pp. 558-582.
Roychoudhury, Abhik, "Debugging as a Science, that too, when your Program is Changing", In Journal of Electronic Notes in Theoretical Computer Science, vol. 266, Oct. 12, 2010, pp. 1-12.
Roychoudhury, Abhik, "Embedded Systems and Software Validation", In Chapter 5, Section, in Publication of Morgan Kaufmann Publishers Inc., May 29, 2009, 1 Page.
Roychoudhury, et al., "Formula-Based Software Debugging", In Journal of Communications of the ACM, vol. 59, Issue 7, Jul. 2016, 11 Pages.
Sumner, et al., "Selecting Peers for Execution Comparison", In Proceedings of the International Symposium on Software Testing and Analysis, Jul. 17, 2011, pp. 309-319.
Visan, et al., "Temporal Debugging: Automating Time Travel Debugging with URDB", Retrieved from <<http://www.ccs.neu.edu/home/xindong/oopsla10.pdf>>, Mar. 26, 2010, pp. 1-12.
Wang, et al., "An Effective Reversible Debugger of Cross Platform Based on Virtualization", In Proceedings of the International Conference on Embedded Software and Systems, May 25, 2009, pp. 448-453.
Weiss, et al., "Root: Replaying Multithreaded Traces with Resource-Oriented Ordering", In the Proceedings of the Twenty-Fourth ACM Symposium on Operating Systems Principles, Nov. 2013, 15 Pages.
Wu, et al., "Elastic and Scalable Tracing and Accurate Replay of Non-deterministic Events", In Proceedings of the 27th International ACM Conference on International Conference on Supercomputing, Jun. 10, 2013, 10 Pages.
Bravo, et al., "Towards Effective and Efficient Search-based Deterministic Replay", In the Proceedings of the 9th Workshop on Hot Topics in Dependable Systems, Nov. 3, 2013, 6 Pages.
"Notice of Allowance Issued in U.S. Appl. No. 15/453,060", dated Dec. 29, 2017, 13 Pages.
Albert, et al., "Verifying Trace Inclusion Between an Experimental Frame and a Model", In Proceedings of the 2010 Spring Simulation Multiconference, Society for Computer Simulation International, Apr. 2010, 8 Pages.
"Final Office Action Issued in U.S. Appl. No. 15/631,872", dated May 9, 2018, 14 Pages.
"Non Final Office Action Issued in U.S. Appl. No. 15/631,872", dated Jan. 4, 2018, 14 Pages.
Barr, et al., "Tardis: affordable time-travel debugging in managed runtimes", In Proceedings of the ACM International Conference on Object Oriented Programming Systems Languages & Applications, Oct. 20, 2014, 16 Pages.
Cutulenco, et al., "Mining timed regular expressions from system traces", In Proceedings of the 5th International Workshop on Software Mining, SoftwareMining 2016, Sep. 3, 2016, 8 Pages.
Deutch, et al., "Type inference and type checking for queries on execution traces", In Proceedings of the VLDB Endowment, vol. 1, Issue 1, Aug. 1, 2008, 12 Pages.
Dietrich, et al., "Learning effective query transformations for enhanced requirements trace retrieval", In Proceedings of the 28th IEEE/ACM International Conference on Automated Software Engineering (ASE), Nov. 11, 2013, 6 Pages.
Goldsmith, et al., "Relational Queries over Program Traces", In Proceedings of 20th Annual ACM SIGPLAN Conference on Object-Oriented Programming, Systems, Languages, and Applications, Oct. 16, 2005, 18 Pages.
Gu, et al., "Reusing Debugging Knowledge via Trace-based Bug Search", In Proceedings of the ACM International Conference on Object Oriented Programming Systems Languages and Applications, Oct. 19, 2012, 16 Pages.
Mace, et al., "Pivot tracing: dynamic causal monitoring for distributed systems", In Proceedings of the 25th Symposium on Operating Systems Principles, Oct. 4, 2015, 16 Pages.
"International Search Report and Written Opinion Issued in PCT Application No. PCT/US2018/020829", dated Jul. 6, 2018, 14 Pages.
"International Search Report and Written Opinion Issued in PCT Application No. PCT/US2018/020830", dated Jun. 29, 2018, 14 Pages.
"Notice of Allowance Issued in U.S. Appl. No. 15/631,872", dated Sep. 12, 2018, 9 Pages.

\* cited by examiner

INDEXING A TRACE BY INSERTION OF KEY FRAMES FOR REPLAY RESPONSIVENESS

CROSS-REFERENCE TO RELATED APPLICATION

This application is a continuation of U.S. patent application Ser. No. 15/453,008, filed Mar. 8, 2017, titled "INDEXING A TRACE BY INSERTION OF KEY FRAMES FOR REPLAY RESPONSIVENESS", which is related to U.S. patent application Ser. No. 15/453,060, filed Mar. 8, 2017 and titled "INDEXING A TRACE BY INSERTION OF MEMORY SNAPSHOTS FOR REPLAY RESPONSIVENESS" The entire contents of each of these applications is incorporated herein by reference in its entirety.

BACKGROUND

When writing code during the development of software applications, developers commonly spend a significant amount of time "debugging" the code to find runtime and other source code errors. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

During recording/tracing, a "time travel" debugger may take approaches to recording trace files that increase the practical amount of time that a program can be traced, that reduce the impact on the program being traced, and/or that reduce utilization of resources on the computer system(s) on which the traced program executes. For example, rather than storing a full record of memory addresses/values read and written during execution, some debuggers may record only the memory values that are consumed (read) by the program's code instructions. Additionally, rather than tracking each code instruction that was executed, some debuggers record only data relating to a small subset of these code instructions (e.g., the side effects of their execution, the register values supplied as inputs). Then, during replay, the programs' code is re-executed while being supplied with the traced memory and register values, which causes the program to re-execute in substantially the same manner that it did when it was traced—including reproducing the same memory state, processor register state, etc. at discrete points in time.

However, while the forgoing techniques can provide significant benefits during tracing (e.g., small trace files, low-overhead of tracing, etc.), the trace files they produce may not be optimally suited for a responsive debugging experience. For example, obtaining program state (e.g., memory and register values) at given points in time may involve replaying significant portions of program execution. This can provide an undesirable user experience, since it may take a debugger long periods of time to respond to a given user query (e.g., to replay to a given breakpoint and provide program state at that breakpoint).

BRIEF SUMMARY

At least some embodiments described address the recognition by the inventors that the performance and resource utilization goals (and, often, the trace computing environment used) during trace recording are different than the performance and resource utilization goals (and, often, the replay computing environment used) during trace replay. In general, these embodiments address these differences by indexing trace files for responsive replay—including replaying data stream(s) from a trace file that was generated at trace time, while recording an indexed trace file with characteristics that account for the performance and resource utilization goals of replay (and, potentially, the replay computing environment to be used) to provide a responsive debugging experience.

In some embodiments, recording this indexed trace file includes breaking trace data stream(s) into a plurality of sections through the insertion of key frames at identified points of interest—in which each section is defined by its bounding beginning and ending key frames. The points of interest are identified based on program characteristics that are of general interest during debugging (e.g., function boundaries, exceptions, etc.), as well as target section execution times (i.e., ensuring that each section is of a size that will execute within a target execution time range). As such, a debugger has access to a granular set of trace sections that can each be replayed (starting their beginning key frame) in order to reproduce program state at interesting points in program execution, avoiding the need to replay large portions of program execution.

Additionally, in other embodiments, recording this indexed trace file includes pre-calculating memory addresses and values that are encountered during execution of different sections of a trace data stream, and storing an additional trace data stream, including storing memory snapshot data structures that include these pre-calculated memory addresses and values. As such, using these memory snapshots, a debugger can quickly return memory state at many points in the trace, further avoiding the need to replay large portions of program execution.

In some embodiments, a method for creating key frames during indexing of a trace for responsive trace replay includes identifying one or more responsiveness goals for trace replay, including identifying a target trace section replay time. The method also includes replaying at least a portion of execution of one or more executable entities based on one or more trace data streams, and, while replaying execution of the one or more executable entities, and based at least on the identified target trace section replay time, identifying a plurality of points of interest in execution of the one or more executable entities. The method also includes creating at least one a key frame for each of the identified plurality of points of interest, each key frame enabling replay of at least one of the one or more executable entities beginning at the key frame.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described address the recognition by the inventors that the performance and resource utilization goals (and, often, the trace computing environment used) during trace recording are different than the performance and resource utilization goals (and, often, the replay computing environment used) during trace replay. In general, these embodiments address these differences by indexing trace files for responsive replay—including replaying data stream(s) from a trace file that was generated at trace time, while recording an indexed trace file with characteristics that account for the performance and resource utilization goals of replay (and, potentially, the replay computing environment to be used) to provide a responsive debugging experience.

In some embodiments, recording this indexed trace file includes breaking trace data stream(s) into a plurality of sections through the insertion of key frames at identified points of interest—in which each section is defined by its bounding beginning and ending key frames. The points of interest are identified based on program characteristics that are of general interest during debugging (e.g., function boundaries, exceptions, etc.), as well as target section execution times (i.e., ensuring that each section is of a size that will execute within a target execution time range). As such, a debugger has access to a granular set of trace sections that can each be replayed (starting their beginning key frame) in order to reproduce program state at interesting points in program execution, avoiding the need to replay large portions of program execution.

Additionally, in other embodiments, recording this indexed trace file includes pre-calculating memory addresses and values that are encountered during execution of different sections of a trace data stream, and storing an additional trace data stream, including storing memory snapshot data structures that include these pre-calculated memory addresses and values. As such, using these memory snapshots, a debugger can quickly return memory state at many points in the trace, further avoiding the need to replay large portions of program execution.

Figure 1:
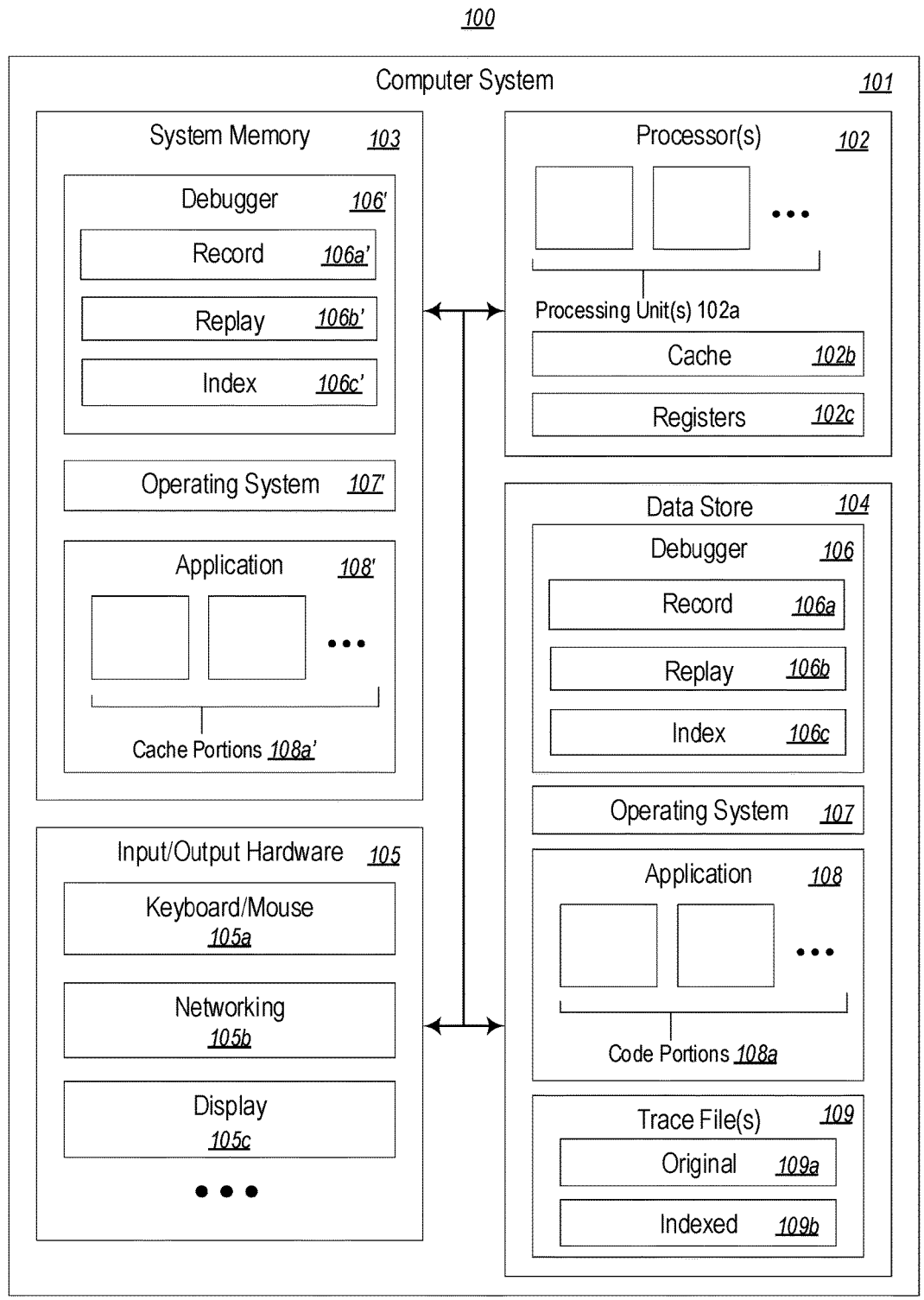
FIG. 1 illustrates an example computing environment that facilitates indexing a trace.

To the accomplishment of the foregoing, FIG. 1 illustrates an example computing environment 100 that facilitates indexing a trace. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiments, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

The data store 104, which typically comprises durable storage, can store computer-executable instructions and/or data structures representing application code such as, for example, a debugger 106 (including, for example, a record component 106a, a replay component 106b, and a indexing component 106c), an operating system 107, and an application 108 (including portions of executable code 108a of the application 108). The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime debugger data 106' (runtime record data 106a', runtime replay data 106b', and runtime indexing data 106c'), runtime operating system data 107', and runtime application data 108' (including, for example, runtime variables, data structures, etc. of application 108 as it executes, as well as runtime code portions 108a' which are in-memory copies of code portions 108a).

While the record component 106a, replay component 106b, and indexing component 106c are depicted as being part of debugger 106, it will be appreciated that one more of these components could be a standalone application, or part of some other application. The record component 106a is usable to trace execution of an application, such as application 108 (including its executable code portions 108a), and to store trace data in the trace file(s) 109. The record component 106a may, in some embodiments, be integrated into the operating system 107, itself, into a hypervisor, or into some other runtime or virtualization technology. The record component 106a may also exist at an entirely different computer system. Thus, the record component 106a may trace execution of code at another computer system. Then, the trace file(s) 109 resulting from that tracing can be transferred (e.g., using the networking hardware 105b) to the computer system 101 for indexing by the indexing component and/or replay by the replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes processing unit(s) 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more virtual processing units 102a presented by that single physical processing unit.

Each processing unit 102a executes processor instructions that are defined by applications (e.g., debugger 106, operating system 107, application code portions 108a, etc.), and which instructions are selected from among a predefined processor instruction set architecture. The particular instruction set architecture of a given processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102b, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code portions 108a of application 108, the shared cache 102b stores a subset of the runtime code portions 108b' in a code cache section of the shared cache 102b, and stores other runtime application data 108' (e.g., variables, data structures, etc.) in a data cache section of the shared cache 102b. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

The replay component 106b replays one or more trace file(s) 109 by executing the code of the executable entity upon which the trace file(s) 109 are based at the processor(s) 102, while supplying that code with traced data (e.g., register values, memory values, etc.) from the trace file(s) 109 at appropriate times. Thus, for example, the record component 106a may record execution of one or more code portions 108a of application 108 at the processor(s) 102, while storing trace data (e.g., memory values read by code instructions, register values supplied code instructions, etc.) in the trace files(s) 109. Then, the replay component 106b can re-execute the code portion(s) 108a at the processor(s) 102, while supplying that code with the trace data from the trace files(s) 109 so that the code is executed in the same manner that it was at trace time.

According the embodiments herein, the indexing component 106c may take as input one or more trace file(s) 109 (e.g., original trace file(s) 109a), and record one or more trace file(s) 109 (e.g., indexed trace file(s) 109b). As outlined previously, original trace file(s) 109a may have been recorded by the record component 106a (at this computer system 101 or an entirely different computer system) with characteristics consistent with performance and resource utilization goals applicable to low-overhead and efficient recording, while the indexed trace file(s) 109b are recorded by the indexing component 106c with characteristics that account for the performance and resource utilization goals of replay. For example, the original trace file(s) 109a may have been recorded with an emphasis on reduced file size and low recording overhead, which may have the tradeoff(s) of requiring a runtime reproduction of memory and/or of providing a coarse set of key frames from which a replay can be initiated (which may limit the degree to which replay can be parallelized). The indexed trace file(s) 109b, on the other hand, may be recorded by the indexing component 106c with an emphasis on responsive replay (including the ability for replay to be significantly parallelized), which may have the tradeoff of a larger trace file size. Notably, the indexing component 106c may be configured to take as input a variety of formats of original trace file(s) 109a, including taking as input original trace file(s) 109a from entirely different vendors than a vendor of the record component 106a.

While FIG. 1 illustrates original trace file(s) 109a and indexed trace file(s) 109b as being separate, it will be appreciated that they could actually be the same file. For example, rather than recording an entirely new file, the indexing component 106c may update/augment the input trace file with indexing data. For example the indexing component 106c may update existing data streams of an input trace file, insert additional data streams into an input trace file, append data to the end of an input trace file, prepend data to the beginning of an input trace file, etc.

Figure 2:
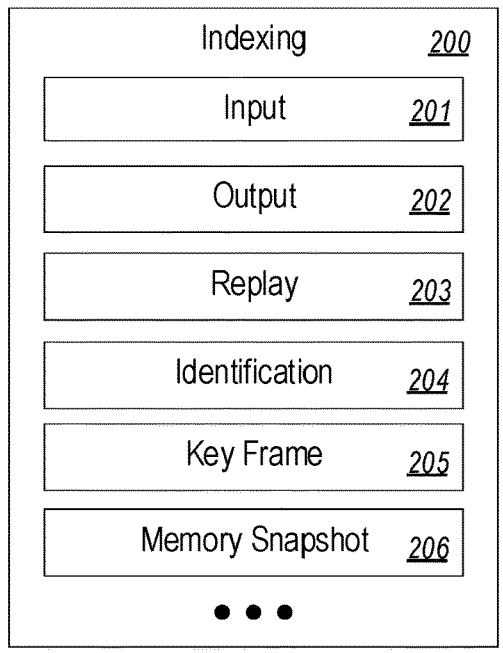
FIG. 2 illustrates an example of an indexing component.

FIG. 2 illustrates an example of an indexing component 200, which may correspond, for example, to the indexing component 106c of FIG. 1. As depicted, indexing component 200 includes a number of sub-components, such as, for example, an input component 201, an output component 202, a replay component 203, an identification component 204, a key frame component 205, and/or a memory snapshot component 206. The depicted identity and arrangement of sub-components 201-206 are merely one example as an aide in description, and one of ordinary skill in the art will recognize that the particular identity and number of sub-components of the indexing component 200 can vary greatly based on implementation (e.g., as indicated by the ellipses).

In general, the input component 201 accesses/receives a trace generated during a trace recording. For example, the input component 201 may access one or more original trace files(s) 109a, which are to be indexed by the indexing component 200, from the data store 104, from system memory 103, and/or using network hardware 105b.

The output component 202 outputs an indexed trace recording that is generated based on the trace recording received at the input component 201. For example, in parallel with and/or after operation of other components (e.g., replay component 204, identification component 204, key frame component 205, memory snapshot component 206, etc.) on the input trace recording, the output component 202 can output/record an indexed trace recording (i.e., indexed trace file(s) 109b) to the data store 104, to system memory 103, and/or using network hardware 105b. As indicated above, this indexed trace file could be an entirely new trace file, but it may alternatively be the original trace file itself. Thus, as used in the disclosure herein and in the claims, an "indexed trace file" can be construed to be an entirely new trace file, or an original trace file that has been augmented with indexing data. In this latter circumstance, outputting/recording an indexed trace file could therefore include augmenting the file that was input by the input component 201 (e.g., by modifying existing data streams, adding new data streams, appending/prepending data to the file, etc.).

The replay component 203 replays the original trace files(s) 109a received at the input component 201, so that they can be optimized/indexed by the identification component 204, key frame component 205, memory snapshot component 206, etc. In some embodiments, the replay component 203 calls or otherwise utilizes replay component 106b of FIG. 1, though replay component 203 could be entirely separate from replay component 106b, a derivative of replay component 106b, etc.

The identification component 204 identifies replay goals and/or code characteristics that are used as part of generating a trace that emphasizes facilitating a responsive replay. Examples of these goals/characteristics are provided hereinafter in connection with specific embodiments using the goals/characteristics.

The key frame component 205 utilizes goals/characteristics identified by the identification component 204 in order to insert new key frames into the indexed trace file(s) 109b. These embodiments are discussed primarily in connection with FIGS. 5 and 6.

The memory snapshot component 206 utilizes goals/characteristics identified by the identification component 204 in order to generated one or more additional data streams into the indexed trace file(s) 109b, which contain a plurality of memory snapshots. These embodiments are discussed primarily in connection with FIGS. 7-9.

Figure 3:
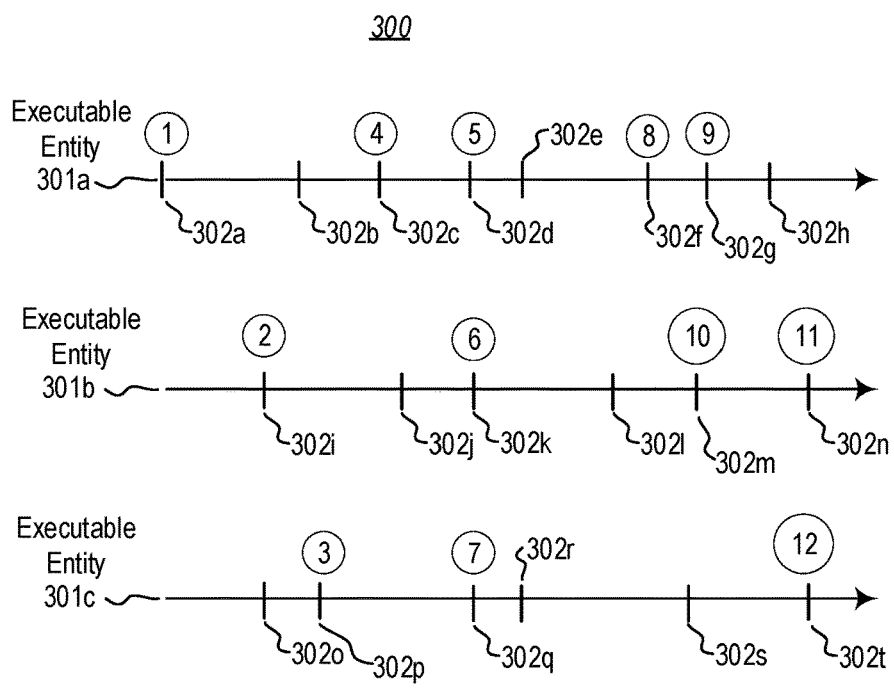
FIG. 3 illustrates an example timing diagram representing a portion of execution of three executable entities.

FIG. 3 illustrates an example timing diagram 300 representing a portion of execution of three executable entities 301a-301c (e.g., as observed during recording/tracing by the record component 106a), with execution commencing at the left end of the arrow, and proceeding to the right. For example, executable entities 301a-301c may correspond to threads of application 108a that execute code from one or more of code portions 108a. In another example, executable entities 301a-301c may correspond to threads of a kernel of the operating system 107. In FIG. 3, the executable entities 301a-301c execute in parallel (e.g., concurrently, each at a different physical or virtual processing unit 102a), though the indexing embodiments herein can operate in environments in which the executable entities 301a-301c execute "single threaded," sharing time at a single processing unit.

In FIG. 3, individual events occur along each arrow. For example, in general these events correspond to individual processor instructions executed as part of each executable entity. Since, on modern processors, these events can easily number in the billions for mere seconds of execution, they are not expressly depicted in FIG. 3. However, FIG. 3 does identify several events across the entities (i.e., events 302a-302t) that may be of particular interest to during debugging. For example, they may correspond to instructions associated with interesting memory accesses (e.g., those that would be the basis of an orderable event, as discussed later), instructions associated with certain logical boundaries (e.g., a call to or an exit from a function, a module, a kernel transition, etc.), instructions associated with exceptions, instructions associated with cache flushes, instructions associated with input/output operations (e.g., disk accesses, network accesses, etc.), instructions associated with activity of a runtime environment (e.g., a garbage collection activity), etc. Events may also be associated with data obtained from replay of the entit(ies), such as an amount of elapsed time (e.g., "wall clock" time), an amount of processing time (e.g., processor cycles used), reaching a particular instruction count, etc. While events 302a-302t are depicted as having occurred, it is noted that the record component 106a may not actually recognize each of them as being interesting events.

Figure 4:
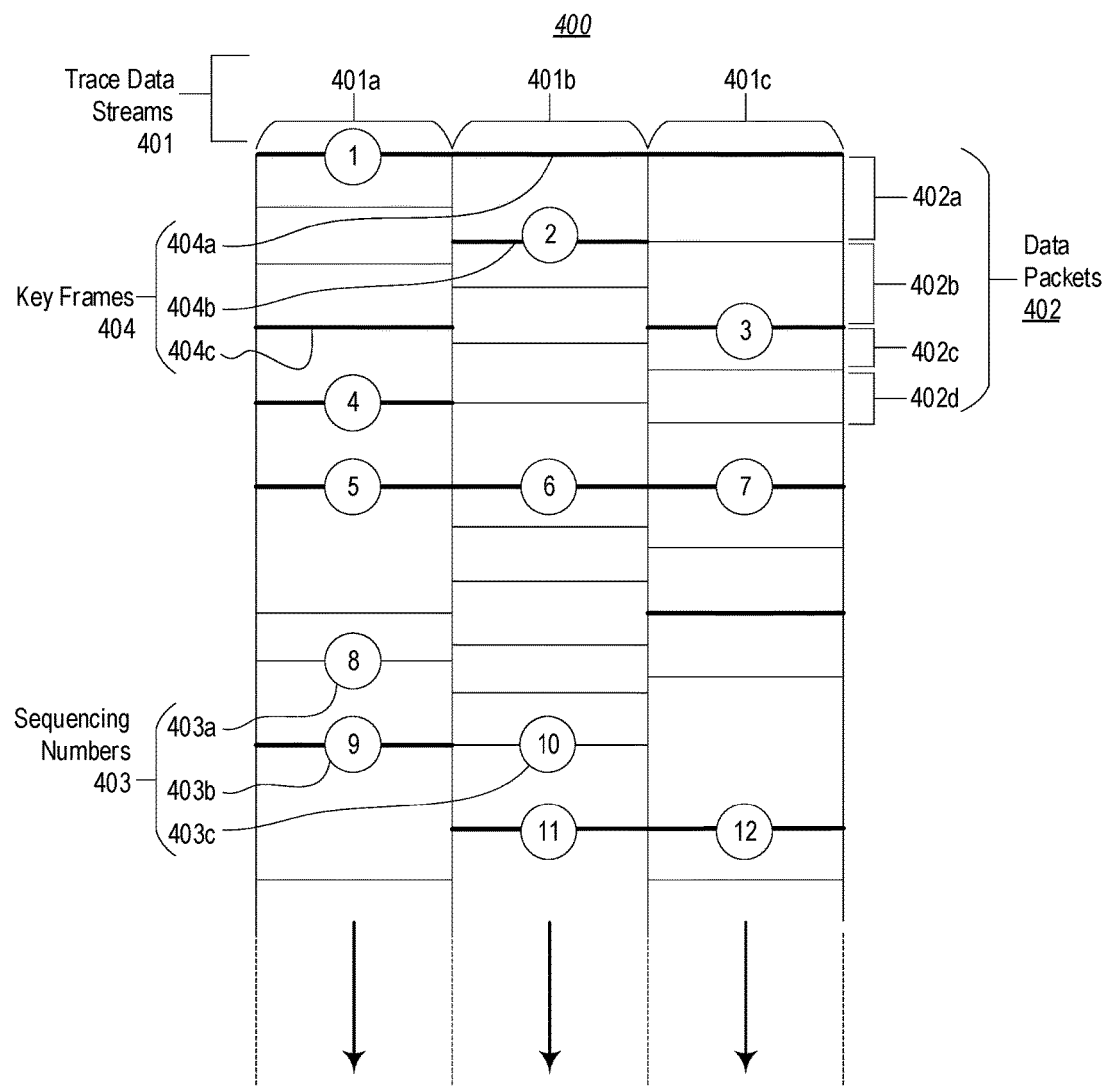
FIG. 4 illustrates an example of a trace file recorded based on the timing diagram of FIG. 3.

In view of FIG. 3, FIG. 4 illustrates one example of a trace file 400 that might be generated by the record component 106a based on the execution of the executable entities 301a-301c depicted in FIG. 3. In FIG. 4, which is based on a parallel execution of executable entities 301a-301c, the trace file 400 independently stores a different data stream recording data representing execution of a corresponding entity. Thus, in FIG. 4, the trace file 400 includes three trace data streams 401a-401c (referred to generally as trace data streams 401), each recording a trace of execution of one of executable entities 301a-301c. It will be appreciated that the trace file 400 could include any number of trace data streams 401, depending on a number of processing units 102a available at the computer system 101 and/or a number of executable entities produced by the program being traced (e.g., application 108). It will also be appreciated that the trace data streams 401 may be included in a single file trace file, or may each be stored in different related files.

Each trace data stream 401 includes a plurality of data packets storing trace data that is usable by the replay component 106b to reproduce execution of its corresponding executable entity, by supplying appropriate recorded state data (e.g., register values, memory addresses and values, etc.) to executable code of the executable entity at appropriate times. Thus, using the information in the data streams 401, and using the actual executable code of the application whose execution was traced, a full reproduction of execution of that code can be reproduced by the replay component 106b. In some embodiments, each data packet could potentially represent the execution of a plurality of code instructions. For example, a data packet may record information that identifies a code instruction to be executed, and its inputs. Then, the replay component 106b may replay a series of instructions, where each instruction in the series is dependent only on the outputs of the prior instruction(s) to it in the series, and/or other program state (e.g., register values, memory values, etc. that were established as part of replaying prior data packet(s) in the same trace data stream 401.

FIG. 4 depicts data packets as being bounded by the horizontal lines in each data stream. Four data example packets 402 in data stream 401c are expressly labeled as data packets 402a-402d. As depicted, individual data packets may be of differing sizes, depending on trace file implementation and on the particular data stored in each packet. Example data that may be included in a data packet includes information for identifying a code instruction executed (e.g., a count of instructions executed since the last logged code instruction, a processor instruction counter value, etc.), register value(s) provided to that code instruction, memory address(es)/value(s) read, any side effects of executing the code instruction (e.g., resulting register values), etc.

The trace file 400 includes standard data packets (which are a depicted as beginning with a light horizontal line), as well as key frames 404 (which are a depicted as beginning with heavy horizontal lines). A key frame is a type of data packet that stores sufficient information to begin replay execution of an executable entity from the point of the key frame onward without the need of having execution/replay state from packets prior to the key frame. For example, a key frame may store values for all relevant processor registers, information necessary to reproduce memory values from that point onward, etc.

The trace file 400 includes a key frame at the beginning of each trace data stream 401 (which enables the replay component 106b to begin replay of each trace data stream), as well as additional key frames appearing throughout each trace data steam 401. Three example key frames are expressly labeled in FIG. 4 as key frame 404a (which occurs at the beginning of trace data stream 401b), key frame 404b (which occurs in connection with an orderable event, which are discussed later), and key frame 404c. In general, the record component 106a can record a key frame at any point in a data stream 401. As depicted, they need not occur at the same time across data streams, or at any particular frequency.

As mentioned above, key frames enable the replay component 106b to initiate replay of each trace data stream 401 at various points. For example, referring to data stream 401a, the replay component 106b can use key frames to initiate execution at different parts in the stream, including at the start of the data stream, at sequencing numbers 4, 5, and 9 (which, as depicted, each corresponds with a key frame), and at key fame 404c. Thus, key frames define different independently repayable trace sections, with each section being bounded on both ends by a key frame.

In some embodiments, when using the example format of trace file 400, the record component 106a records each data stream 401 generally independently from the other data streams during parallel execution of the code being traced. In doing so, record component 106a does not generally record the actual timing execution of events by one entity versus the timing of execution of events by another entity, since code instruction executed by one entity generally doesn't affect code instructions executing another entity. Thus, the data packets in one trace data stream 401 can generally be replayed independent of the data packets in another trace data stream 401.

The trace file 400 does, however, include some data packets identifying events that are "orderable" across the entities/data streams. These orderable events generally correspond to events that are performed by one executable entity that could affect execution of another entity, such as accessing memory shared by the entities. In FIGS. 3 and 4, orderable events are represented with a "sequencing number" that defines the order in which these events occurred across the entities relative to each other. Thus, in some embodiments, the sequencing number which is a monotonically incrementing number ("MIN"), that is guaranteed to not repeat. For example, the trace file 400 includes twelve sequencing numbers (depicted as circled numerals 1-12), each defining the order in which different orderable events executed across entities 301a-301c relative to each other.

In some embodiments, orderable events are identified based on a "trace memory model" that defines whether to treat events as orderable or non-orderable based on their interactions across executable entities. For example, orderable and/or non-orderable events may be defined based on how the threads interact through shared memory, their shared use of data in the shared memory, etc. Depending on implementation, a trace memory model used by the record component 106a may be weaker or stronger than a memory model used by the processor 102. The trace memory model used may be a memory model defined by a programming language used to compile code (e.g., C++14), or some other memory model defined expressly for purposes of tracing.

A first example trace memory model may treat as orderable only kernel calls (from user mode), traps, and exceptions. This trace memory model would have low overhead, since these operations are relatively "expensive" is their own right, they are likely tracked anyway and provide a very coarse grained overview of ordering. A second example trace memory model may treat as orderable full fences (i.e., operations that are have both acquire & release semantics). Examples of such operations may include INTEL's "locked" instructions, kernel calls, exceptions, and traps. This memory model would provide enough ordering for nearly all cross-thread communication that happens in the process when the code uses "interlocked" types of primitives to communicate cross threads, which is common in operating such as WINDOWS from MICROSOFT CORPORATION). A third example trace memory model may treat all acquires and releases as orderable. This memory model may be suitable for processors based ARM instruction sets, because ARM does not treat most loads and stores as acquires or releases. On other architectures, such as from INTEL (in which a majority of memory accesses are acquires or releases), this would equate to ordering almost all memory accesses. A fourth example trace memory model may treat as orderable all memory loads. This would provide for strong ordering but may lead to decreased performance as compared to the other example memory models. The foregoing memory models have been presented as examples only, and one of ordinary skill in the art will recognize, in view of the disclosure herein, a vast variety of memory models may be chosen.

In view of the foregoing discussion of trace file 400, it will be appreciated that key frames enable the replay component 106b to initiate replay of different sections of the same trace data stream, and thus enable the replay component 106b to replay these different sections of the same trace data stream 401 independently and in parallel. Additionally, with the trace data streams 401 being recorded independently, and with the timing of events in one trace data stream being generally independent from the timing of events in another trace data stream, the replay component 106b can replay sections from different trace data streams 401 independently and in parallel.

Sequencing numbers then enable the replay component 106b to combine the results of parallel replay of these individual sections to present an accurate representation of how the entities actually executed when they were recorded. In particular, the sequencing numbers (which, as discussed above, define the relative order of orderable events across the trace data streams) enable the replay component 106b to choose an ordering among the different trace sections to define a total ordering of all instructions in the trace file 400 that can be used to present results at the debugger 106. Such an ordering enables the 106 debugger to present a consistent view of program state (e.g., memory and registers) at all points in the trace, and no matter how the replay component 106b actually arrived at that point in execution (e.g., what order in which it executed individual trace sections).

A valid ordering places the trace sections in an order that would ensure that sequencing events are presented in proper order (i.e., in their monotonically increasing order). However, a valid ordering does not need to reproduce the exact order in which all instructions executed relative to each other at trace time. For example, in reference to FIG. 3, a valid ordering needs to ensure that an orderable event at sequencing number three is presented has having occurred prior to an orderable event at sequencing number four. However, the ordering does not need to ensure that a non-orderable event executed just after sequencing number three by entity 301c is presented prior to a non-orderable event executed just after sequencing number four by entity 301a, since these events are non-orderable events at different entities.

Valid orderings need not include sections from all trace data streams (e.g., because execution of one thread may not be relevant to obtaining desired data at a given point of interest), and multiple valid orderings could be chosen. For example, suppose that reverse breakpoint on the event at sequencing number 8 is being requested. One valid ordering of sections to reach this breakpoint using only trace data streams 401a and 401c could include:

1. A section on trace 401a starting at the key frame at sequencing number 1, and ending at an instruction just prior to the key frame at sequencing number 4, then
2. A section on trace 401c starting its beginning key frame, and ending at an instruction at the key frame at sequencing number 3, then
3. A section on trace 401a starting at the key frame at sequencing number 4, and ending at an instruction just prior to the key frame at sequencing number 5, then
4. A section on trace 401c starting at an instruction just after the key frame at sequencing number 3, and ending at an instruction just prior to the key frame at sequencing number 7, and then
5. A section on trace 401a starting at the key frame at sequencing number 5, and ending at an instruction just prior to the key frame at sequencing number 9. Note that this section includes sequencing number 8 between sequencing numbers 5 and 9.

If these sections are viewed has having been replayed linearly, in the order specified, all the instructions on trace 401a up to (but not including) sequencing number 9 are replayed, and all of the instructions on trace 401c up to (but not including) sequencing number 7 are replayed, and each orderable event that was replayed is viewed as being replayed in the correct order (i.e., 1, 3, 4, 5, and 8).

Another valid ordering using all the trace data streams that could be chosen to arrive at sequencing event 8 could include:

1. A section on trace 401a starting at the key frame at sequencing number 1, and ending at an instruction just prior to the key frame at sequencing number 4, then
2. A section on trace 401b starting its beginning key frame, and ending at an instruction just prior to the key frame at sequencing number 2, then
3. A section on trace 401c starting its beginning key frame, and ending at an instruction just prior to the key frame at sequencing number 3, then
4. A section on trace 401b starting at the key frame at sequencing number 2, and ending at an instruction just prior to the key frame at sequencing number 6, then
5. A section on trace 401c starting at an instruction at the key frame at sequencing number 3, and ending at an instruction just prior to the key frame at sequencing number 7, then
6. A section on trace 401a starting at the key frame at sequencing number 4, and ending at an instruction just prior to the key frame at sequencing number 5, then
7. A section on trace 401a starting at the key frame at sequencing number 5, and ending at an instruction just prior to the key frame at sequencing number 9. Note again that this section includes sequencing number 8 between sequencing numbers 5 and 9.

Similarly, if these sections are viewed has having been replayed linearly, in the order specified, all the instructions on trace 401a up to (but not including) sequencing number 9 are replayed, all of the instructions on trace 401b up to (but not including) sequencing number 6 are replayed, and all of the instructions on trace 401c up to (but not including) sequencing number 7 are replayed, and each orderable event that was replayed is viewed as being replayed in the correct order (i.e., 1, 2, 3, 4, 5, and 8).

The replay component 106b need not actually perform the replay of the sections according to this determined ordering. Instead, replay component 106b can replay the sections in any order, so long as the results obtained by the replay are presented according to the constraints of the determined ordering. Thus, the replay component 106b can queue the trace sections for replay in any order, and can replay them in any order at one or more processing units 102a, so long as the results are presented in a valid ordering.

Recall that FIG. 3 identified several events across the entities (i.e., events 302a-302t) that may be of particular interest to during debugging, and further that, while events 302a-302t did occur during execution, the record component 106a may not have actually recognized each of them as being interesting events. This is reflected in the trace file 400 of FIG. 4. In particular, the trace file 400 includes a record of all the orderable events (i.e., sequencing numbers 1-12, corresponding to events 302a, 302i, 302p, 302c, 302d, 302k, 302q, 320f, 302g, 302m, 302n, and 302t, respectively). In addition, the record component 106a included a key frame at many of these sequencing numbers. In addition, drawing a comparison between FIGS. 3 and 5, it can also be observed that the record component 106b recorded key frame 404c at event 302b. However, there are several other events (e.g., events 302e, 302f, 302h, 302j, 302l, 302m, 302o, 302r, and 302s) for which there are no key frames. These events may be of particular interest during debugging (and thus may be the subject of breakpoints), but using trace file 400 the replay component 106b may need to replay large sections of different trace data streams 401 in order to reach those points of execution, leading to an unresponsive debugging experience.

Figure 5:
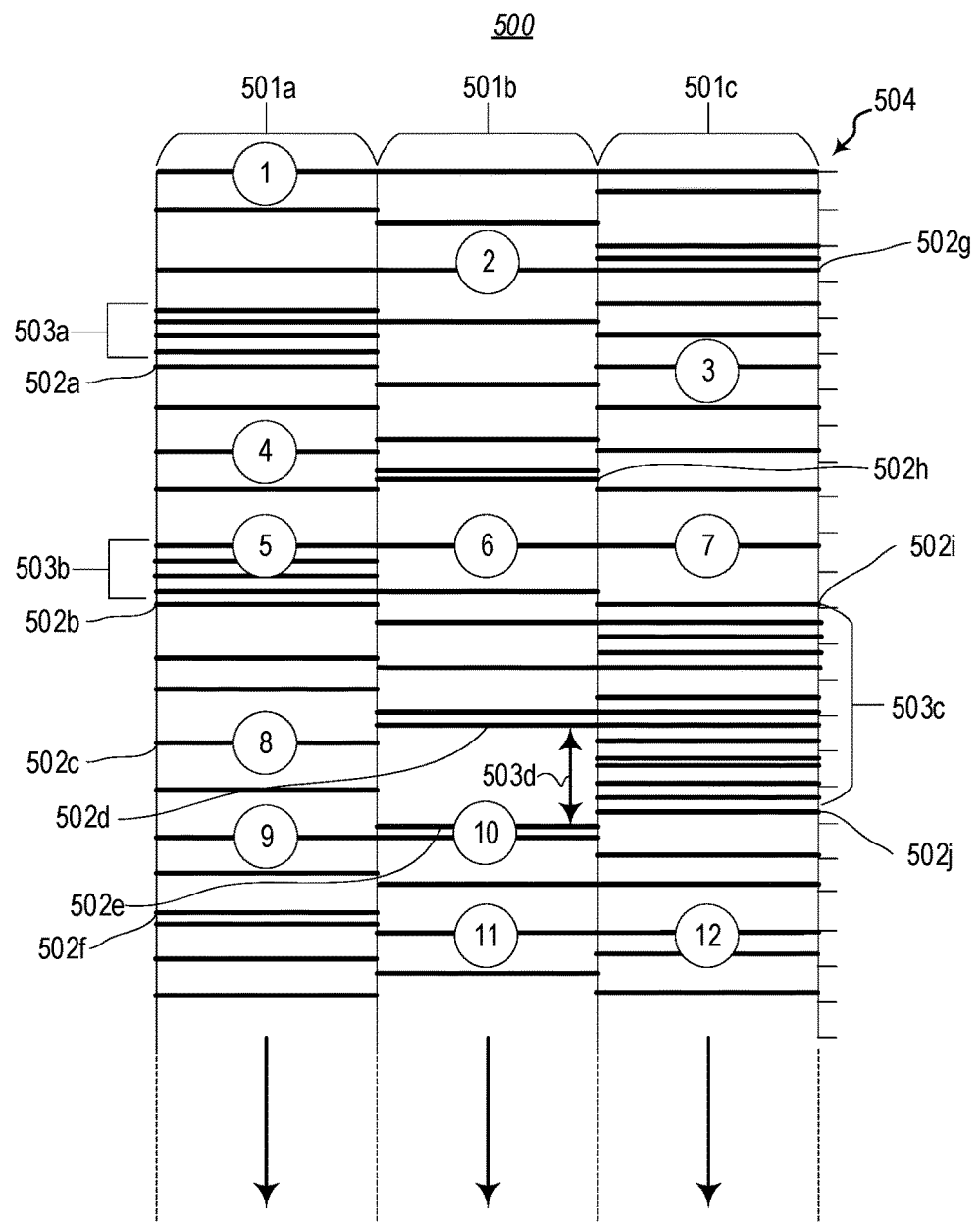
FIG. 5 illustrates an example of an indexed trace file, generated based on the trace file of FIG. 4, and which includes additional key frames based on replay goals and identified points of interest.

FIG. 5, on the other hand illustrates an example of a trace file 500 that might be generated by the indexing component 200, based on receiving trace file 400 as input. For clarity, FIG. 5 shows only key frames and sequencing numbers, not individual data packets. In FIG. 5, trace file 500 that includes additional key frames, that are inserted by the indexing component 200 based on identified responsiveness goals for trace replay, and based identified points of interest in execution of executable entities 301a-301c. More particularly, the trace file 500 is generated based upon the input component 201 receiving/reading trace file 400 and the replay component 203 replaying the trace file 400. In connection with replay of trace file 400, the identification component 204 identifies different locations to insert new key frames by the key frame component 205 while writing trace file 500 with the output component 202.

In some embodiments, a responsiveness goal used by the identification component 204 may be a target amount of time it should typically take for a debugger to return a result. Based on this goal, the identification component can determine an average granularity with which to divide each trace data stream 501 into different sections using key frames. For example, it is generally recognized that most humans are unable to perceive time periods of about 50 milliseconds (ms) or less. Thus, if a computer user interface takes about 50 ms or less to respond to a user's input, that response is generally perceived by a human user as being instantaneous.

As such, the identification component 204 makes a goal that the trace file 500 generated by the indexing component 200 enable the replay component 106b to replay to arbitrary points in a trace within about 50 ms, for at least a desired percentage (e.g., 95%) of queries. In doing so, the identification component 204 may identify attributes of a target environment for replay, such as a number and/or speed of processing units anticipated to be 102a available for replay. In addition, the identification component 204 may identify an amount of trace data that is typically replayed (e.g., 95% of the time) in order to reach arbitrary points in most traces. This identification may be based on a statistical analysis of past usage of the debugger 106 at this computing system 101 and/or at other computing systems. Based on the foregoing (and potentially other) factors, the identification component 204 can identify a target time it should take an individual processing unit 102a to replay a single section of the trace file 500.

As an example only, in one computing environment having four processing units 102a, the identification component 204 could perhaps determine that in order to return a result within 50 ms for about 95% of queries, each trace section should take about 5 ms for an individual processing unit to replay (enabling each processing unit to replay about 10 sections in order to return a result). The identification component 204 may also identify a maximum and a minimum target replay time, such as between 4.5 and 5.5 ms. Then, the identification component 204 cause the key frame component 205 to insert key frames at locations in each trace data stream 501 that would hit these targets.

Thus, in FIG. 5, the trace file 500 includes many additional key frames that are placed semi-regularly based on target time intervals that have been estimated by the identification component 204 to enable each individual trace section (i.e., sections bounded by two key frames) to be replayed within a target time range. Target time intervals 504 are represented in FIG. 5 as ticks to the right of the trace file 500 and could, for example, delineate 5 ms intervals for use in a goal of having a key frame every 4.5-5.5 ms. It is noted that, due to the differing nature of the instructions being executed, it may not be possible to insert key frames at exact intervals, and thus the use of ranges and targets.

Another responsiveness goal used by the identification component 204 could be to enable efficient replay at and around identified points of interest. For example, as part of reading trace file 400 by the input component 201 and/or as part of replay of trace file 400 by the replay component 205, the identification component 204 may identify points of interest in execution of traced entities, such as events 302a-302t in entities 301a-301b. Depending on the nature of each event, the identification component 204 can cause the key frame component 205 to insert additional key frame(s) at, before, and/or after the event. In addition, depending on the nature of an event, the identification component 204 may prevent the key frame component 205 from inserting key frames where it may have otherwise inserted them based on other goals.

For example, FIG. 5 illustrates additional key frames that have been inserted by the key frame component 205 in connection with the events from FIG. 3 that has no specific key frames in the trace file 400 of FIG. 4. For example, key frame 502b corresponds with event 302e, key frame 502c corresponds with event 302f (sequencing number 8), key frame 502d corresponds with event 302l, key frame 502e corresponds with event 302m (sequencing number 10), key frame 502f corresponds with event 302h, key frame 502g corresponds with event 302o, key frame 502h corresponds with event 302j, key frame 502i corresponds with event 302r, and key frame 502j corresponds with event 302s. Depending on the type of event the key frames occur at the corresponding event, or at an event just before or after the corresponding event.

The key frame component 205 may insert key frames surrounding an event. For example, in FIG. 5, the key frame component 205 has inserted additional key frames 503a and 503b before key frames 502a (event 302b) and 502b (event 302e). For example, the identification component 204 may have identified these events as being exceptions encountered during execution. Since exceptions are generally an interesting place to investigate during debugging, additional key frames prior to these events can enable quicker and more granular debugging performance around these exceptions.

As another example, in FIG. 5 the key frame component 205 has inserted an additional key frame after key frame 502f (event 302h), and has inserted additional key frames before key frames 502g and 502h (events 302o and 302j). For example, the identification component 204 may have identified these events as function calls, and inserted key frames before the function calls (events 302o and 302j) or after exiting the function call (e.g., 302h). Since function call boundaries are also generally an interesting place to investigate during debugging, additional key frames prior to the function, or after the function returns, can also enable quicker and more granular debugging performance around these exceptions.

As another example, in FIG. 5 the key frame component 205 has inserted an additional key frames 503c between key frames 502i (event 302r) and 502j (event 302s). In this case, event 302r may, for example, correspond to a call to a function or module of particular interest, and event 302s may correspond to a return from the function or module. As such, additional key frames 503c have been inserted to facilitate responsive debugging of this function/module. On the other hand, key frames 502d and 502f (events 302l and 302m) may also represent a call to and return from a function or module. In this case, however, the key frame component 205 has refrained from inserting any key frames in the trace section 403d corresponding to execution of the function/module (even key frames that would appear at a regular interval). This may be because the code being executed between events 302l and 302m is not likely to be the subject of debugging. For example, this code may correspond to third party code, a well-tested function, etc.

It will be appreciated that the insertion of key frames based on identified points of interest may affect the particular locations in which key frames are inserted based on sections that will execute within goal time periods. For example, if a key frame inserted based on identified points of interest falls within the goal time period for inserting a semi-regular key frame, that key frame may be also used as the semi-regular key frame, rather than inserting an additional key frame meet time period goals.

Figure 6:
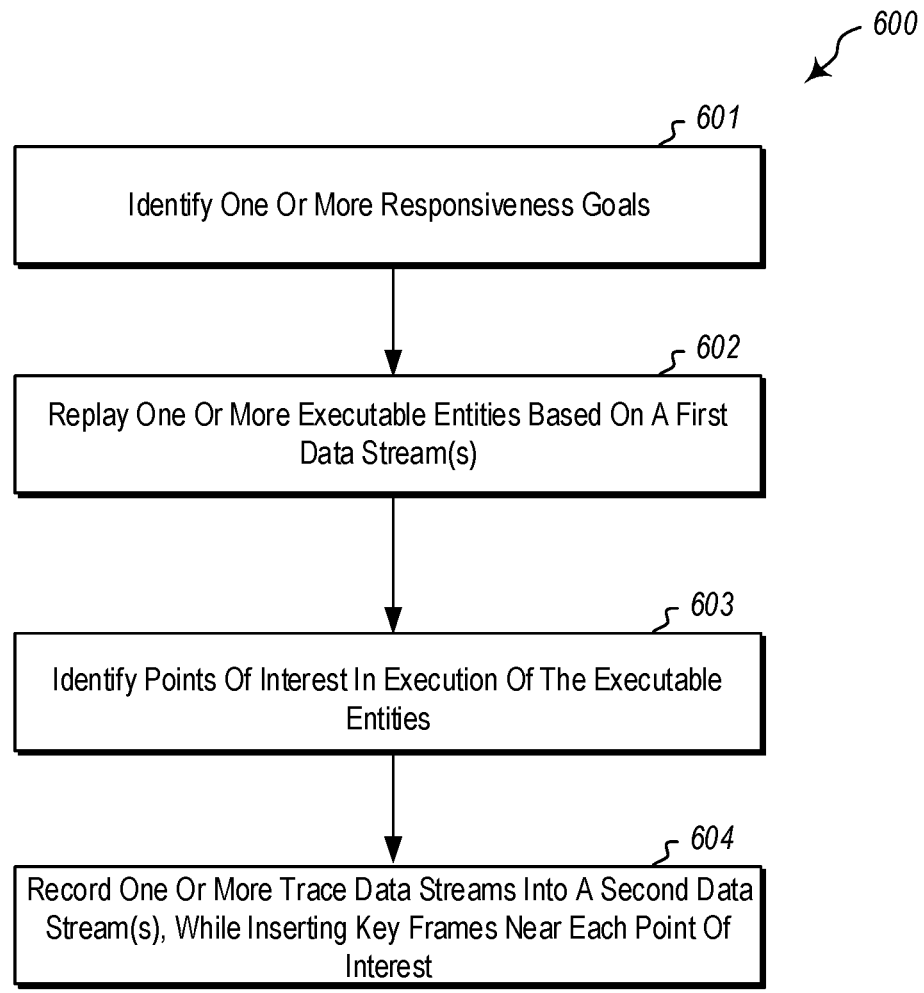
FIG. 6 illustrates a flowchart of an example method for inserting key frames during indexing of a trace for responsive trace replay.

In view of the foregoing, FIG. 6 illustrates an example of a method 600 for inserting key frames during indexing of a trace for responsive trace replay. Method 600 is described in connection FIGS. 1-5. While method 600 is presented as a series of acts, it will be appreciated that the particular number and ordering of the acts shown is only example of inserting key frames during indexing of a trace consistent to the embodiments herein.

As depicted, method 600 includes an act 601 of identifying one or more responsiveness goals. In some embodiments, act 601 comprises identifying one or more responsiveness goals for trace replay, including identifying a target trace section replay time. For example, based on receiving/loading one or more input original trace file(s) 109a at the input component 201 of indexing component 200, the identification component 204 of indexing component 200 identifies one or more responsiveness goals for creating one or more indexed trace file(s) 109b based on the input file(s) 109a. The particular number and type of responsiveness goals may vary but may include a target amount of time it should typically take for a debugger to return a result, including an average granularity with which to divide each trace data stream from original trace file(s) 109a the into different sections using key frames. Thus, in this example, a responsiveness goal includes identifying a target trace section replay time. In one example, the original trace file(s) 109a may be formatted as shown in trace file 400 of FIG. 4, although the indexing component 200 may be capable of inputting a variety of different trace file formats.

In some embodiments, identifying responsiveness goals can comprise identifying a target physical computing environment for replay of the indexed trace file. For example, the identification component 204 may identify an estimated speed and/or number of processing units 102a that will be available, memory resources (e.g., system memory 103) that are anticipated to be available, disk storage resources (e.g., data store 104) that are anticipated to be available, network storage resources (e.g., using networking hardware 105b) that are anticipated to be available, etc. The identification component 204 can then adjust goals based on these resources.

Method 600 also includes an act 602 of replaying one or more executable entities based on first trace data streams(s). In some embodiments, act 602 comprises replaying at least a portion of execution of one or more executable entities based on one or more first trace data streams. For example, the replay component 203 of indexing component 200 (e.g., replay component 106b, in some embodiments) replays one or more trace data streams, each corresponding to a different traced executable entity.

If the original trace file(s) 109a included the trace file 400 of FIG. 4, then act 602 may comprise replaying execution of one or more of entities 301a, 301b, and/or 301c (as shown in FIG. 3) based on trace data streams 401a, 401b, and/or 401c of FIG. 4. Note that, since in the example trace file 400 trace data streams 401a, 401b, and/or 401c were recorded independently, the replay component 203 need not necessarily replay the trace data streams 401a, 401b, and/or 401c at the same time.

Method 600 also includes an act 603 of identifying points of interest in execution of the executable entities. In some embodiments, act 603 comprises, while replaying execution of the one or more executable entities, and based at least on the identified target trace section replay time, identifying a plurality of points of interest in execution of the one or more executable entities. For example, during replay by the replay component 203 of trace data streams in the original trace file(s) 109a, the identification component 204 of the indexing component 200 can identify target key frame insertion points that would create trace sections that can be replayed within a goal time period. For example, in FIG. 5, the identification component 204 has identified target time intervals 504, and which correspond to points near which a key frame could be inserted to ensure that most trace sections replay within the goal time period.

Additionally, the identified points of interest may include interesting events that occurred during execution, and that may be of interest during debugging of the entity that was traced, such as orderable events, function boundaries, module boundaries, exceptions, kernel transitions, runtime environment activity, cache flushes, input/output activity, etc. For example if the original trace file(s) 109a included the trace file 400 of FIG. 4, then act 603 may comprise identifying one or more of events 302a-302t. As discussed in connection with FIG. 4, while some of these events are reflected directly in trace file 400 (e.g., some of the orderable events key frames, and the orderable events being identified with sequencing numbers), many others of the events (e.g., functions boundaries, exceptions, module boundaries, etc.) are not reflected directly in trace file 400.

As discussed previously, the original trace file(s) 109a may not specifically log some events because of certain goals being used by the record component 106a at record time, such as to minimize recording overhead, to minimize trace file size, etc. Additionally or alternatively, the original trace file(s) 109a may not specifically log some events because whatever program created the original trace file(s) 109a is not capable of identifying these events, and/or because the trace file format of the original trace file(s) 109a is not capable of representing these events.

Method 600 also includes an act 604 of recording one or more trace data streams into second trace data stream(s), while inserting key frames near each point of interest. In some embodiments, act 604 comprises recording one or more second trace data streams, including inserting a key frame into the one or more second trace data streams at, or near, each of the identified plurality of points of interest, to create a plurality of trace sections, each key frame enabling replay of at least one of the one or more executable entities beginning at the key frame. For example, the output component 202 of indexing component 200 can output one or more indexed trace file(s) 109b, while the key frame component 205 of the indexing component inserts key frames at, or near, the identified points of interest. As discussed in connection with FIG. 5, these key frames can create sections that are generally of a size that is repayable within a goal time frame, and can include one or more key frames at, before, and/or after identified events of interest (e.g., a key frame at the instruction corresponding to an event of interest, and/or at an instruction before or after the instruction corresponding to the event of interest).

It will be appreciated that inserting key frames at an instruction before/after the instruction corresponding to the event of interest could comprise inserting an instruction immediately before/after the instruction corresponding to the event of interest. Alternatively, inserting key frames at an instruction before/after the instruction corresponding to the event of interest could comprise inserting an instruction near the instruction corresponding to the event of interest (e.g., there could be one or more instructions between the key frame and the instruction corresponding to the event of interest). In some embodiments, it may be desirable to insert a key frame immediately before/after an instruction that transitions to/from a module, and to insert a key frame near an exception.

FIG. 5 illustrates one example of an indexed trace file 109b, which includes new key frames placed regularly based on target time intervals 504; new key frames at orderable events (e.g., key frames 502c and 502e); new key frames at and around exceptions (e.g., key frames 503a before event 302 and key frames 502b/503b at and before event 302e); new key frames at, in, and/or around function/module boundaries (e.g., key frames 502d, 502f, 502g, 502h, 502i, 502j, 503c), etc.

In some embodiments, recording one or more second trace data streams (e.g., into indexed trace file(s) 109b) comprises converting a trace file format of the one or more first trace data streams (e.g., from original trace file(s) 109a). For example, if the original trace file(s) 109a were created with software other than the record component 106a (e.g., a debugger from a different inventor, a different version of record component 106a, etc.), the output component 202 can nonetheless record the new trace data streams in a format used by the record component 106a (e.g., the format of trace files 400, 500, 800, etc.).

Accordingly, some of the embodiments herein index trace files according to performance and resource utilization goals for replay, while potentially considering the specific replay computing environment used, by inserting new key frames into trace files. These key frames may be inserted at semi-regular intervals in order to meet a goal replay time for each trace section created by the key frame, and/or may be inserted at, before, and/or after specifically-identified events of interest.

In some embodiments, the indexing component 200 also stores into trace file 500 aggregate and/or statistical information for individual trace sections. For example, the indexing component 200 may record data such as memory addresses accessed by a trace section, functions called during a trace section, return values seen during a trace section, function input values used during a trace section, the number of exceptions encountered in the trace section, etc. The debugger 106 can then use this data to identify specific trace sections to replay in order to produce requested results.

In some embodiments, at least a portion of this aggregate data comprises memory snapshots. Thus, FIG. 2 illustrates that the indexing component 200 includes a memory snapshot component 206, which can be used to create and insert memory snapshots into an indexed trace file 109b in connection with replay of an input original trace file 109a. Memory snapshots may be inserted in parallel with the insertion of key frames, or may be inserted as a separate indexing pass. Additionally, depending on replay goals, indexing component 200 could insert memory snapshots without inserting new key frames. The particular replay goals and/or the particular locations in which to insert memory snapshots may be determined by the identification component 204.

In general, a memory snapshot is a data structure that stores summary information about the memory addresses and/or values that were encountered during execution of one or more sections of an entity. These snapshots can then be used by the debugger 106 to identify which trace sections should be replayed in order to obtain a specific value of memory at a given point of time. The particular data structure(s) use or storing memory snapshots can vary, but could include, for example, binary trees (e.g., B, B+, B*), hash tables, etc.

It is noted that while key frames may, in some embodiments, store memory values, memory snapshots are distinct from key frames. For example, if a key frame stores memory values, it stores those values that enable replay of an executable entity to be started at the key frame, such as memory values (if any) that would be supplied to the particular processor instruction that executes at the key frame. Memory snapshots, on the other hand, store a summary of memory addresses and/or values that were accessed by a plurality of instructions during one or more sections of execution. Additionally, key frames are stored within the trace data streams while, as discussed later, memory snapshots are typically stored as one or more separate data stream(s) altogether.

The particular data stored in a memory snapshot can vary based on implementation and replay goals, but some embodiments store which memory addresses were encountered when replaying one or more corresponding sections of a trace, along with the most recent value seen at each address. With such structures, the debugger 106 can determine which trace section(s) touched identified memory location(s), and replay only those trace sections in order to return the memory values stored at those identified locations at various times during execution. Additionally, if memory values at the time of a snapshot are requested, they may potentially be returned directly from the snapshot without any replay.

Depending on implementation and trace replay goals snapshots could store additional information as well, such as the number of times each memory location was accessed, an instruction count or some other timestamp identifying when the memory location was accessed, the value of each access, the type of each access (e.g., read or write), etc. Similar to the insertion of key frames, the content and frequency of memory snapshots may be based on replay goals, including the target replay environment. For example, an analysis may be made by the indexing component 200 of desired replay responsiveness versus acceptable trace file size for the indexed trace file(s) 109. It will be appreciated that, in general, a trace file with a greater number of memory snapshots facilitates a more responsive replay, but also results in lager trace file size. Thus, an analysis of replay goals may consider available storage and/or memory resources at a replay computing environment, a total duration of traced execution (e.g., a greater number of snapshots may be inserted for traces having a shorter overall duration), a number of executable entities represented (e.g., a greater number of snapshots may be inserted for traces representing a fewer number of executable entities), etc. It is noted that these factors can also be a consideration for determining how many key frames to insert, since they also directly affect trace file size.

Figure 7:
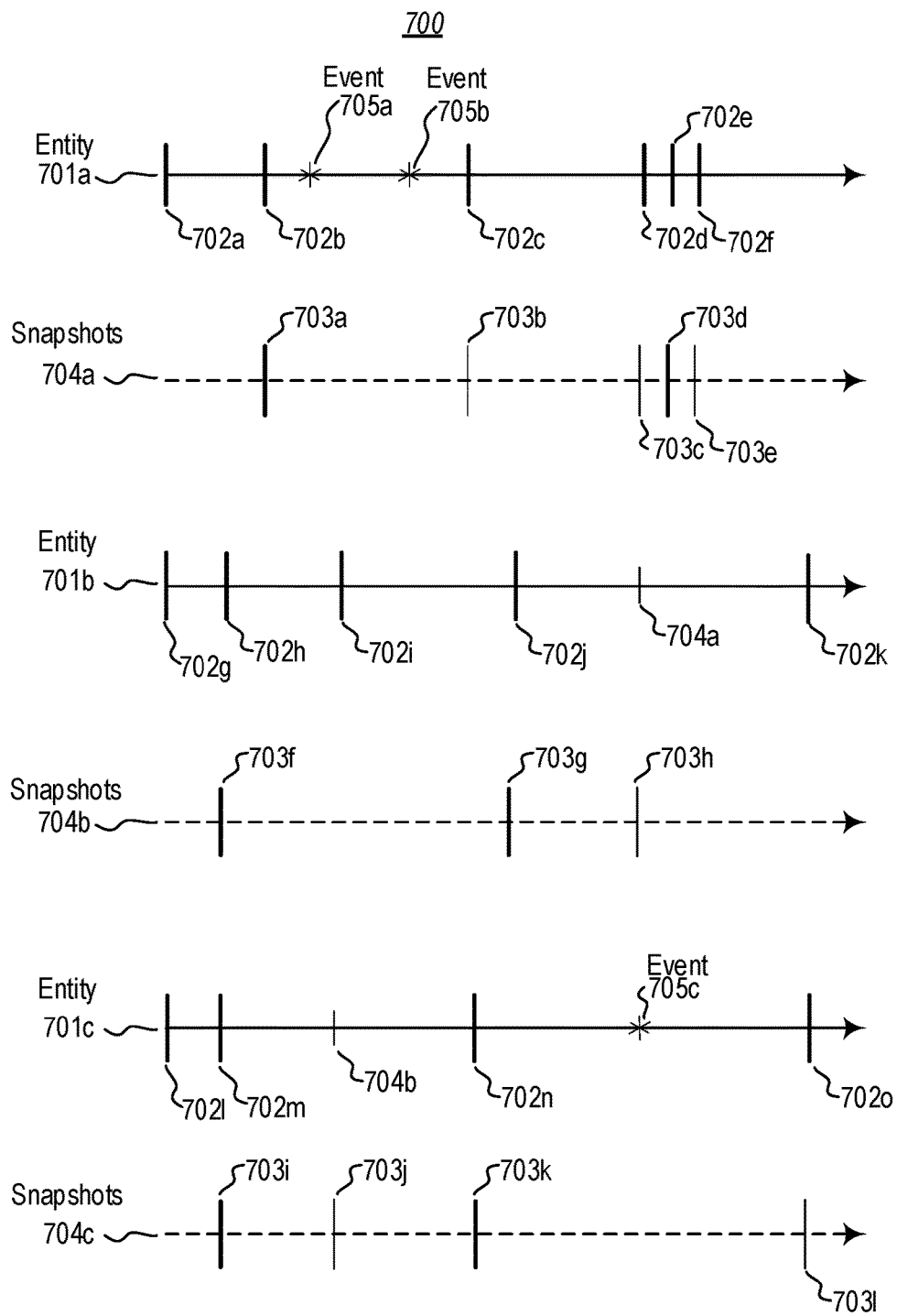
FIG. 7 illustrates an example timing diagram representing a portion of execution of three executable entities, along with corresponding memory snapshots.

To help illustrate the concept of memory snapshots, FIG. 7 illustrates an example timing diagram 700 representing a portion of execution of three executable entities (701a-701c). In FIG. 7, the timeline of execution of executable entities 701a-701c may, for example, represent a view of program execution as seen by the replay component 203 of the indexing component 200 when replaying an original trace file 109a. In FIG. 7, the execution timelines include the locations of a plurality of key frames 702a-702o. These key frames could, for example, correspond to key frames that were already recorded in an original trace file 109a, and/or correspond to new key frames that have been, or will be, inserted into an indexed trace file 109b by the key frame component 205 of the indexing component 200 as discussed above in connection with FIG. 5. The execution timelines for entities 701b and 701c also include the identity of other events 703a and 703b for which there is no key frame. These could, for example, correspond to orderable events for which the indexing component 200 did not insert a key frame.

FIG. 7 also represents three timelines representing the storage of memory snapshots (704a-704c), each corresponding to one of executable entities (701a-701c). As mentioned above, each memory snapshot (703a-703l) comprises a summary of memory addresses and/or values that were encountered during a corresponding section of execution. Thus for example, referring to entity 701a and snapshots 704b, snapshot 703a comprises a summary of memory addresses and/or values that were encountered during execution of entity 701a between key frames 702a and 702b, snapshot 703b comprises a summary of memory addresses and/or values that were encountered during execution of entity 701a between key frames 702b and 702c, and so on to snapshot 703e corresponding to the section between key frames 702e and 702f. Similarly, snapshots 704b capture memory addresses/values encountered during corresponding sections of execution of entity 701b, and snapshots 704c capture memory addresses/values encountered during corresponding sections of execution of entity 701c.

While key frames are a natural location in a trace to record memory snapshots, memory snapshots can be recorded at any time, such as the depicted snapshots 703h and 703j that correspond to events 704a and 704b (e.g., orderable events) on entities 701b and 701c that lack key frames. Similarly, memory snapshots need not occur with each key frame. For example, key frames 702i and 702k on entity 701b each lack a corresponding memory snapshot. Additionally, key frames 702a, 702g, and 702l, which each corresponds to the start of execution each entity, also lacks a snapshot (e.g., because that snapshot would be empty, as no instructions have yet executed).

As mentioned above, some embodiments store memory snapshots comprising the memory addresses that were encountered when replaying one or more corresponding sections of a trace, along with the most recent value seen at each address. Thus, for example, suppose that the same particular memory location is written to at each of events 705a-705c. Here, memory snapshot 703b may indicate that this particular memory location was written to during the section on entity 701a between key frame 702b and 702c, and that the most recent value was the value that was written at event 705b. Likewise, memory snapshot 703l may indicate that the particular memory location also written to during the section on entity 701c between key frame 702n and 702*o*, and that the most recent value was the value that was written at event 705*c*. Later, if a request for program state at key frame 702*c* or at key frame 702*o* were requested at the debugger 106, then the debugger 106 could simply report the values from snapshots 703*b* or 703*l*. If, on the other hand, a request for all writes to the particular memory location were to be made (e.g., as part of watch on a variable or return value), the debugger 106 could use memory snapshots 703*b* and 703*l* to identify that the particular memory location was accessed during the section between key frame 702*b* and 702*c* and the section between key frames 702*n* and 702*o*. The debugger could then replay those sections, starting with key frames 702*b* and 702*n*, in order to identify the value that was written by each event 705.

In some embodiments, a given memory snapshot captures aggregate data for only the section of the trace between itself and a prior memory snapshot. For example, in these embodiments, memory snapshot 703*b* may store data relating only to the section between key frames 702*b* and 702*c*. In other embodiments, however, the memory snapshots provide access to memory values relevant to other trace sections. For example, a memory snapshot may store at least a portion of the data from one or more prior memory snapshots, or may refer back to one or more prior snapshots.

For example, in FIG. 7, memory snapshots 703*a*-703*l* are represented using a combination of heavy and light line weights. In this notation, memory snapshots denoted with a heavy line weight represent "full" memory snapshots, while memory snapshots denoted with a light line weight represent "differential" memory snapshots. Thus, for example, memory snapshots timeline 704*a* includes two full memory snapshots (i.e., memory snapshots 703*a* and 703*d*), and three differential memory snapshots (i.e., memory snapshots 703*b*, 703*c*, and 703*e*), memory snapshots timeline 704*b* includes two full memory snapshots (i.e., memory snapshots 703*f* and 703*g*), and one differential memory snapshot (i.e., memory snapshot 703*h*), etc.

In general, a full memory snapshot stores a record of all memory addresses/values known at the time of the snapshot, whereas a differential memory snapshot stores a record of any memory addresses/values that have changed or been discovered since the prior memory snapshot (whether that be a full memory snapshot or a differential memory snapshot). A differential memory snapshot can then store pointer(s) back to the prior snapshot(s) to that the replay component 106*b* can later traverse the snapshots to obtain memory values.

In some embodiments, memory snapshots are stored on the basis of different ranges of memory addresses. For example, a memory snapshot may comprise a different data structure for each range of memory addresses, or may comprise a data structure with a different node for each range of memory addresses. In one embodiment, for example, each range of addresses corresponds to a fixed amount of memory, such as one kilobyte. In other embodiments, each range of addresses may correspond to a different amount of memory. Whether to use fixed or variable memory ranges may depend on factors such as memory access locality (e.g., to make regions correspond to sections of memory that are frequently accessed), or a desired memory lookup complexity during replay (e.g., fixed memory ranges may enable a single-step lookup since the appropriate memory range structure to use to find a particular memory location can be computed in a straightforward manner, while variable memory ranges may involve an additional step to determine which memory range structure stores a particular memory location).

When storing memory snapshots based on ranges of memory addresses, each range of addresses may individually be the subject of full and differential snapshots. Thus, rather than storing full and differential memory snapshots of the entire memory space available to each entity, embodiments may divide that memory space into different ranges (whether those ranges be fixed in size or variable in size) and perform full and differential snapshots on each of those memory ranges, as needed. Thus, while for simplicity of illustration, each memory snapshot in FIG. 7 is depicted as being either a full snapshot or a differential snapshot, it may be that snapshot at a particular point in the trace may actually comprise both full snapshots for some memory ranges, and differential snapshots for other memory ranges. In one example, a differential snapshot stores memory values that have changed in a given memory range since the last snapshot, along with pointers back to prior snapshots for values that have not changed.

Additionally, the memory snapshots at each memory location need not store snapshot data relating to all memory ranges. For example, while memory snapshot 703*a* may include full snapshots for memory ranges A and B, differential snapshot 703*b* may store snapshot data relating to memory range A but not memory range B (e.g., since the trace section between key frames 702*b* and 702*c* accessed memory addresses in range A but not in range B), and differential snapshot 703*c* may store differential snapshot data relating to memory range B but not memory range A (e.g., since the trace section between key frames 702*c* and 702*d* accessed memory addresses in range B but not in range A).

When determining whether to store a full or differential snapshot for a given address range, the indexing component 200 (e.g., the identification 204 and/or memory snapshot 206 component) may weigh replay responsiveness and/or computational cost for each option, versus the amount of space that each option would occupy on the indexed trace file 109*b*. For example, depending on the number memory locations that have changed for a memory range since the last snapshot, the indexing component 200 may determine that it will actually take less storage to store a full snapshot for that memory page, versus storing a series of pointers back to prior snapshots. In another example, while it may take more trace file space for a given memory range to store a full snapshot versus a differential snapshot, if there is already an extensive chain of differential snapshots the indexing component 200 may determine that it is more desirable for replay to use the space on the trace file versus requiring a long traversal of snapshots at replay time. In another example, the indexing component 200 may determine whether traversal of a chain of differential snapshots would cause a disk read at replay (e.g., since the chain of differential snapshots would occupy more than the size of one disk page). In this case, the indexing component 200 may determine that it is more desirable for replay to store a full snapshot for the range than to store another differential snapshot.

Figure 8:
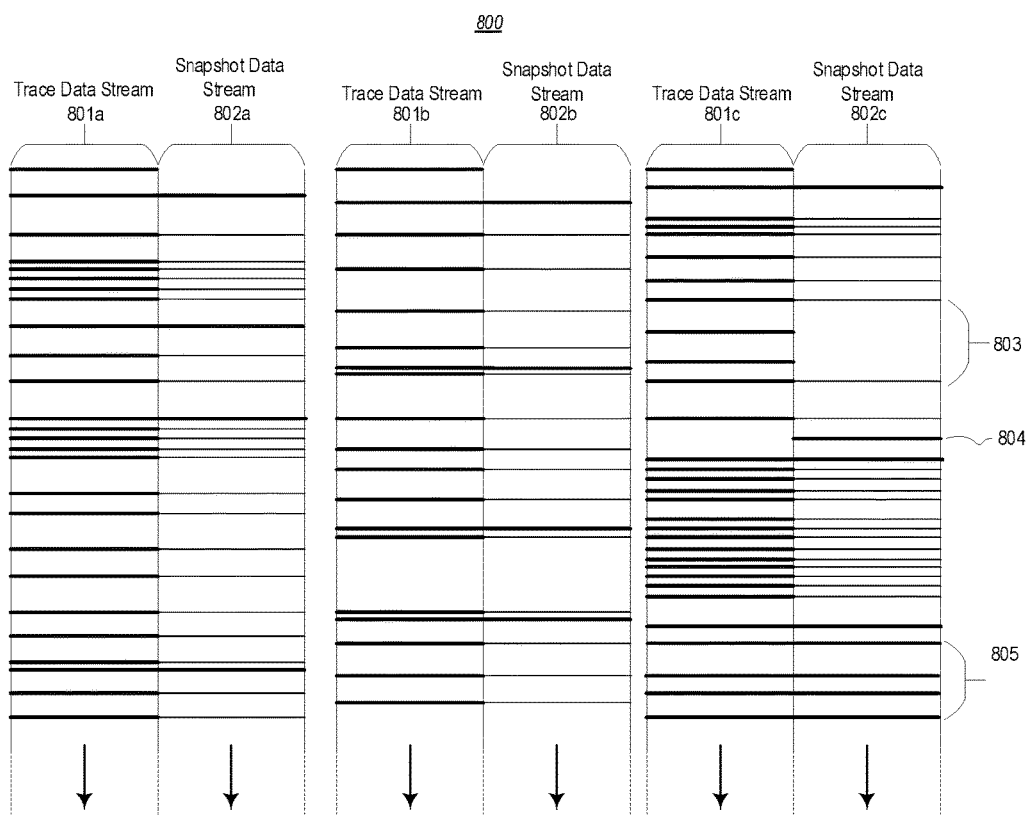
FIG. 8 illustrates an example of an indexed trace file, generated based on the trace file of FIG. 4, and which includes memory snapshots based on replay goals.

In view of the foregoing, FIG. 8 illustrates an example indexed trace file 800 that includes memory snapshots. In FIG. 8, trace data streams 801*a*-801*c* correspond, respectively, to trace data streams 501*a*-501*c*. Each trace data stream 801 includes the key frames depicted in FIG. 5. Trace file 800, however, also includes snapshot data streams 802*a*-802*c*, each of which corresponds to one of the trace data streams, as depicted. While the snapshot data streams 802 are depicted for clarity as being separate data streams, it will be appreciated that they could actually be embodied in a single snapshot data stream.

In FIG. 8, each snapshot data stream 802 includes a plurality of memory snapshots (depicted as horizontal lines), which generally correspond to the key frames in their corresponding trace data stream 801. However, as discussed above, memory snapshots need not occur at each key frame, and can occur at points other than key frames. Thus, for example, each snapshot data stream 802 lacks a memory snapshot corresponding to the key frame beginning each trace data stream 801. In addition, in region 803, snapshot data stream 802c lacks memory snapshots corresponding to key frames occurring in trace data stream 801c during the same time period. Further, snapshot data stream 802c also includes a memory snapshot 804 that does not correspond to any key frame in trace data stream 801c.

Similar to FIG. 7, the snapshot data streams 802 may include a combination of full and differential memory snapshots (also depicted with heavy versus light line weight). As seen by snapshots 805, differential snapshots need not follow full snapshots. In fact, the snapshot data streams 802 could, in some embodiments, include only full memory snapshots.

Figure 9:
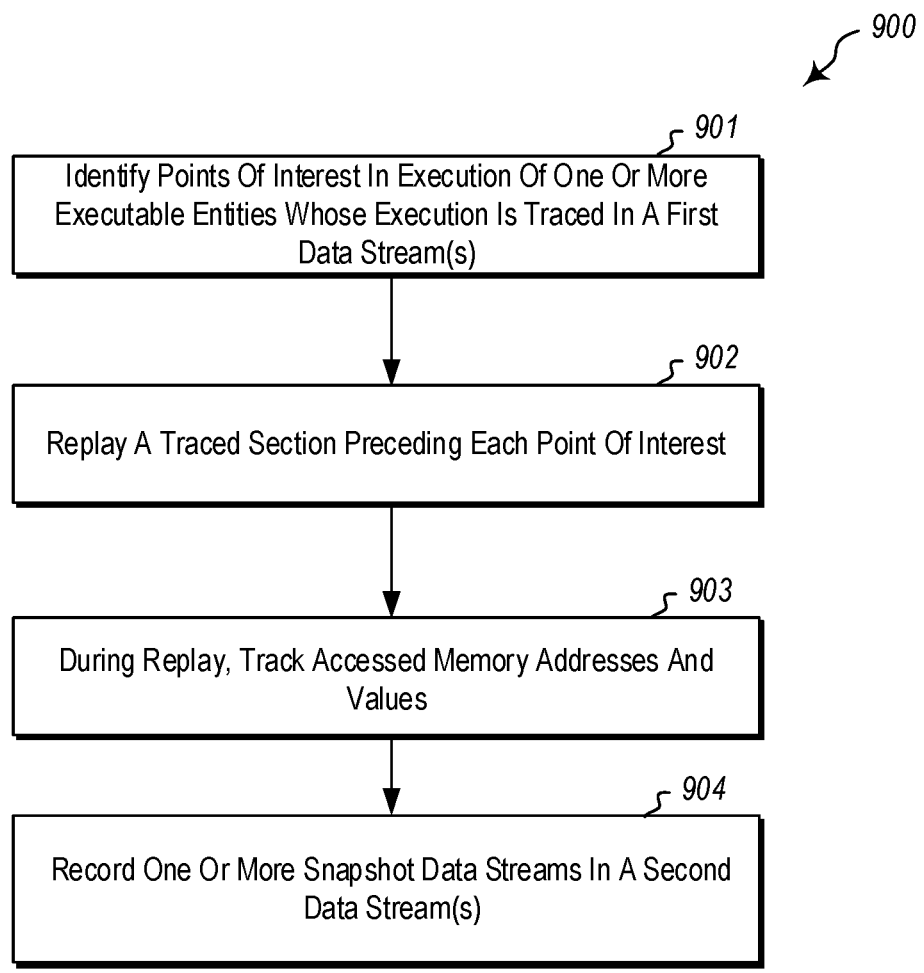
FIG. 9 illustrates a flowchart of an example method for inserting memory snapshots during indexing of a trace for responsive trace replay.

In view of the foregoing, FIG. 9 illustrates an example of a method 900 for inserting memory snapshots during indexing of a trace for responsive trace replay. Method 900 is described in view of FIGS. 1-8. While method 900 is presented as a series of acts, it will be appreciated that the particular number and ordering of the acts shown is only example of inserting memory snapshots during indexing of a trace consistent to the embodiments herein.

As depicted, method 900 includes an act 901 of identifying points of interest in execution of one or more executable entities whose execution is traced in first trace data stream(s). In some embodiments, act 901 comprises identifying a plurality of points of interest in execution of one or more executable entities whose execution is traced in one or more first data streams. For example, referring to FIG. 2, the identification component 204 can identify points of interest in an original trace file 109a that is being replayed by the replay component 203, which points are suitable for recording memory snapshots to provide for a responsive replay. For example, as explained in connection with FIGS. 7 and 8, points of interest may correspond to key frames, sequencing numbers, or other points in execution that a user may be interested in during debugging. In some embodiments, the points of interest may correspond, at least in part, to those points of interest that have been identified for the insertion of key frames (i.e., as described generally in connection with FIGS. 3-6). Referring to FIG. 8, for example, points of interest for recording memory snapshots may correspond, at least in part, to key frames in trace data streams 801a-801c. These key frames may, in turn, correspond to potentially interesting events, such as function boundaries, module boundaries, exceptions, kernel calls, runtime environment activity, cache flushes, or input/output activity.

In some embodiments, the plurality of points of interest are identified based, at least in part, on one or more responsiveness goals and/or one or more storage utilization goals. For example the, identification component 204 may determine a frequency with which to record memory snapshots based on balancing target replay responsiveness with storage utilization goals (i.e., trace file size). Thus, for example, if responsiveness is preferred over efficient storage utilization, the points of interest may include a relatively large number of key frames/sequencing numbers. If, on the other hand, efficient storage utilization is preferred over responsiveness, the points of interest may include a relatively few number of key frames/sequencing numbers. In some embodiments, the responsiveness and/or storage utilization goals are based, at least in part on a target replay computing environment.

Method 900 also includes an act 902 of replaying a traced section preceding each point of interest. In some embodiments, act 902 comprises, based on the one or more first data streams, replaying a traced section of execution of the one or more executable entities preceding each point of interest. For example, the replay component 203 can replay one or more sections of execution leading up each point identified for recording a memory snapshot. In some embodiments, this replay corresponds to a replay that is performed for identifying locations for inserting key frames (for example, replay of an original trace file 109a). In other embodiments, this replay may be separate from that replay, such as one that occurs after key frames have already been inserted into an indexed trace file 109b. In this situation, replay of each traced section may comprise a replay of the indexed trace file 109b, including replaying from a key frame preceding the memory snapshot recording location.

Method 900 also includes an act 903 of, during replay, tracking accessed memory addresses and values. In some embodiments, act 903 comprises, during replay of each traced section of execution, tracking which memory addresses are accessed by the one or more executable entities during replay of the section, and at least a most recent value encountered at each memory address during replay of the section. For example, the memory snapshot component 206 can track which memory addresses are accessed (e.g., read from or written to) during replay of each trace section, along with one or more memory values seen during the access.

Method 900 also includes an act 904 of recording one or more snapshot data streams in second trace data stream(s). In some embodiments, act 904 comprises recording one or more second data streams, including recording a plurality of memory snapshots in connection with the plurality of points of interest into the one or more second data streams, each memory snapshot summarizing memory addresses and values encountered in at least one section of execution preceding each point of interest. For example, the memory snapshot component 206 can insert one or more additional data streams into the indexed trace file 109b written by the output component 202. These data streams can record one or more memory snapshots at each of these points of interest summarizing at least memory addresses/values encountered during replay of the preceding section. For example, FIG. 8 illustrates an example of a trace file 800 that includes snapshot data streams 802a-802c that record memory snapshots corresponding to trace data streams 801a-801c.

As discussed above, memory snapshots may be full memory snapshots, or may be differential memory snapshots. Additionally, while memory snapshots could be based on an entity's entire memory space, in some embodiments that are more granularly based on smaller memory regions (which could be fixed or variable in size).

Accordingly, some of the embodiments herein index trace files according to performance and resource utilization goals for replay, while potentially considering the specific replay computing environment used, by inserting memory snapshots into trace files. These memory snapshots may be inserted occasionally (e.g., at key frames, sequencing number, etc.) in order to prove a more responsive replay, with the tradeoff of an increased trace file size.

Although the subject matter has been described in language specific to structural features and/or methodological acts, it is to be understood that the subject matter defined in the appended claims is not necessarily limited to the features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
   one or more hardware processors; and
   one or more hardware computer-readable storage media having stored thereon computer-executable instructions that are executable by the one or more processors to cause the computer system to create key frames during indexing of a trace for responsive trace replay, the computer-executable instructions including instructions that are executable to cause the computer system to perform at least the following:
   identify one or more responsiveness goals for trace replay, including identifying a target trace section replay time based on a computation using at least an estimated number of trace sections to be replayed to obtain a replay result and an estimated number of processing units available during replay;
   replay at least a portion of execution of one or more executable entities based on one or more trace data streams;
   while replaying execution of the one or more executable entities, and based at least on the identified target trace section replay time, identify a plurality of points of interest in execution of the one or more executable entities; and
   create at least one a key frame for each of the identified plurality of points of interest, each key frame enabling replay of at least one of the one or more executable entities beginning at the key frame.

2. The computer system of claim 1, wherein identifying the one or more responsiveness goals for trace replay comprises identifying a target physical computing environment for replay of the one or more second trace data streams.

3. The computer system of claim 1, wherein identifying the plurality of points of interest in execution of the one or more executable entities comprises identifying one or more of: a replay time interval, an orderable event, a function boundary, a module boundary, an exception, a kernel transition, runtime environment activity, a cache flush, an amount of elapsed time, an amount of processing time, reaching a particular instruction count, or an input/output activity.

4. The computer system of claim 1, the computer-executable instructions also including instructions that are executable to cause the computer system to insert the at least one key frame into one or more existing trace data streams.

5. The computer system of claim 1, the computer-executable instructions also including instructions that are executable to cause the computer system to insert the at least one key frame into one or more new trace data streams.

6. The computer system of claim 1, wherein identifying the one or more responsiveness goals for trace replay comprises identifying a target disk usage, and wherein identifying the plurality of points of interest in execution of the one or more executable entities comprises identifying a number of the plurality of points of interest based on the target disk usage.

7. The computer system of claim 1, the computer-executable instructions also including instructions that are executable to cause the computer system to augment one or more existing trace data streams with the at least one key frame.

8. The computer system of claim 1, the computer-executable instructions also including instructions that are executable to cause the computer system to insert the at least one key frame into one or more existing trace files.

9. The computer system of claim 1, the computer-executable instructions also including instructions that are executable to cause the computer system to insert the at least one key frame into one or more new trace files.

10. A method, implemented at a computer system that includes one or more processors, for creating key frames during indexing of a trace for responsive trace replay, the method comprising:
    identifying one or more responsiveness goals for trace replay, including identifying a target trace section replay time based on a computation using at least an estimated number of trace sections to be replayed to obtain a replay result and an estimated number of processing units available during replay;
    replaying at least a portion of execution of one or more executable entities based on one or more trace data streams;
    while replaying execution of the one or more executable entities, and based at least on the identified target trace section replay time, identifying a plurality of points of interest in execution of the one or more executable entities; and
    creating at least one a key frame for each of the identified plurality of points of interest, each key frame enabling replay of at least one of the one or more executable entities beginning at the key.

11. The method of claim 10, further comprising augmenting one or more existing trace data streams with the at least one key frame.

12. The method of claim 10, wherein identifying the plurality of points of interest in execution of the one or more executable entities comprises identifying one or more of: a replay time interval, an orderable event, a function boundary, a module boundary, an exception, a kernel transition, runtime environment activity, a cache flush, an amount of elapsed time, an amount of processing time, reaching a particular instruction count, or an input/output activity.

13. The method of claim 10, further comprising inserting the at least one key frame into one or more existing trace data streams.

14. The method of claim 10, further comprising inserting the at least one key frame into one or more new trace data streams.

15. The method of claim 10, wherein identifying the one or more responsiveness goals for trace replay comprises identifying a target disk usage, and wherein identifying the plurality of points of interest in execution of the one or more executable entities comprises identifying a number of the plurality of points of interest based on the target disk usage.

16. The method of claim 10, further comprising inserting the at least one key frame into one or more existing trace files.

17. The method of claim 10, further comprising inserting the at least one key frame into one or more new trace files.

18. A computer program product comprising one or more hardware storage devices having stored thereon computer-executable instructions that are executable by one or more processors of a computer system to cause the computer system to create key frames during indexing of a trace for responsive trace replay, the computer-executable instructions including instructions that are executable to cause the computer system to perform at least the following:

identify one or more responsiveness goals for trace replay, including identifying a target trace section replay time based on a computation using at least an estimated number of trace sections to be replayed to obtain a replay result and an estimated number of processing units available during replay;

replay at least a portion of execution of one or more executable entities based on one or more trace data streams;

while replaying execution of the one or more executable entities, and based at least on the identified target trace section replay time, identify a plurality of points of interest in execution of the one or more executable entities; and create at least one a key frame for each of the identified plurality of points of interest, each key frame enabling replay of at least one of the one or more executable entities beginning at the key.

19. The computer program product of claim 18, the computer-executable instructions also including instructions that are executable to cause the computer system to insert the at least one key frame into one or more existing trace data streams or trace files.

20. The computer program product of claim 18, the computer-executable instructions also including instructions that are executable to cause the computer system to insert the at least one key frame into one or more new trace data streams or trace files.

\* \* \* \* \*